United States Patent
Levy et al.

(10) Patent No.: US 11,444,733 B2
(45) Date of Patent: Sep. 13, 2022

(54) PILOT SIGNALING SUPPORTING DIGITAL POST-DISTORTION (DPOD) TECHNIQUES

(71) Applicant: QUALCOMM Incorporated, San Diego, CA (US)

(72) Inventors: Sharon Levy, Binyamina (IL); Assaf Touboul, Netanya (IL); Guy Wolf, Rosh Haayin (IL); Igor Gutman, Ramat Gan (IL)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 16/942,223

(22) Filed: Jul. 29, 2020

(65) Prior Publication Data

US 2022/0038229 A1 Feb. 3, 2022

(51) Int. Cl.
*H04W 4/00* (2018.01)
*H04L 5/00* (2006.01)
*H04L 25/02* (2006.01)
*H04W 72/04* (2009.01)
*H04W 72/08* (2009.01)

(52) U.S. Cl.
CPC .......... *H04L 5/0048* (2013.01); *H04L 5/0023* (2013.01); *H04L 5/0073* (2013.01); *H04L 25/0224* (2013.01); *H04W 72/042* (2013.01); *H04W 72/082* (2013.01)

(58) Field of Classification Search
None
See application file for complete search history.

(56) References Cited

U.S. PATENT DOCUMENTS

| 9,621,311 B2 * | 4/2017 | Lee .................... H04L 5/001 |
| 2005/0063298 A1 | 3/2005 | Ling et al. |
| 2009/0052470 A1 | 2/2009 | Yun et al. |
| 2013/0044692 A1 * | 2/2013 | Nory ................ H04L 5/0048 370/329 |

(Continued)

OTHER PUBLICATIONS

Partial International Search Report—PCT/US2021/042365—ISA/EPO—dated Nov. 3, 2021.

(Continued)

*Primary Examiner* — Phirin Sam
(74) *Attorney, Agent, or Firm* — Qualcomm Incorporated

(57) ABSTRACT

Methods, systems, and devices for wireless communications are described. Some systems may support digital post-distortion (DPoD) processing at a base station. In some such systems, a user equipment (UE) may process a data message for transmission, where a resulting signal associated with the data message includes non-linear characteristics that are handled by DPoD on the receiver-side. The non-linear characteristics may cause the signal to leak into out-of-band (OOB) resources, potentially resulting in interference. In some examples, the UE may transmit the data message to the base station in a multi-user system. To support mitigation of non-linear interference on signaling by other UEs, the UE may additionally transmit pilot signals in OOB resources (e.g., in addition to in-band resources) where the non-linearity may be expected to negatively affect other communications. The base station may use the OOB pilot signals to perform channel estimation and interference mitigation.

30 Claims, 17 Drawing Sheets

(56) References Cited

U.S. PATENT DOCUMENTS

| | | | |
|---|---|---|---|
| 2015/0146668 A1* | 5/2015 | Liu | H04L 5/0035 370/329 |
| 2018/0115357 A1 | 4/2018 | Park et al. | |
| 2020/0014433 A1* | 1/2020 | Bengtsson | H04W 72/121 |

OTHER PUBLICATIONS

International Search Report and Written Opinion—PCT/US2021/042365—ISA/EPO—dated Jan. 7, 2022.

* cited by examiner

Capability Message 210

Resource Allocation Configuration 215

Pilot Signal 220

Mixer 410

Oscillator 415

Power Amplifier 420

Antenna 425

DPoD Component 430

400

PILOT SIGNALING SUPPORTING DIGITAL POST-DISTORTION (DPOD) TECHNIQUES

FIELD OF TECHNOLOGY

The following relates generally to wireless communications and to pilot signaling supporting digital post-distortion (DPoD) techniques.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that provide for pilot signaling that supports digital post-distortion (DPoD) techniques. Generally, the described techniques provide for a user equipment (UE) to transmit pilot signals in out-of-band (OOB) regions (e.g., outside of frequency resources allocated for data communications by the UE) where non-linearity may be expected. The pilot signals may support channel estimation and interference mitigation in the OOB regions. For example, some wireless communications systems may support receiver-side techniques, such as DPoD, for mitigating the impact of non-linear signal processing (e.g., the use of a non-linear power amplifier) on the transmitter side.

A UE may transmit a data message in in-band resources (e.g., resources allocated for the data transmission) to a base station, and the base station may perform DPoD to process the data message. In some examples, the UE may transmit a signal representing a radio frequency data message. The signal may exhibit non-linear characteristics as a side effect of RF processing (e.g., power amplification) used to process the data for transmission, and—as a result—the non-linear signal may leak into OOB resources (e.g., resources not allocated to the UE for transmitting the data message).

In some examples, the base station may configure the UE with OOB pilot signaling. That is, the base station may transmit a configuration message indicating a set of resources in which to transmit the pilot signals outside of the resources allocated for data transmission. The UE may transmit the pilot signals to the base station in in-band and OOB resources, and the base station may perform channel estimation based on the received pilot signals. That is, the base station may acquire in-band and OOB channel knowledge based on the pilot signaling and may accurately estimate the channel to mitigate potential interference from the non-linear characteristics of the signal in OOB regions.

A method for wireless communications at a UE is described. The method may include transmitting, to a base station, a first pilot signal within a first set of frequency resources, where the first set of frequency resources is allocated for data communications at the UE, and transmitting, to the base station, a second pilot signal outside the first set of frequency resources and within a second set of frequency resources, where the first set of frequency resources is a subset of the second set of frequency resources and the first pilot signal and the second pilot signal are associated with a same data message.

An apparatus for wireless communications at a UE is described. The apparatus may include a processor, memory coupled to the processor, and instructions stored in the memory. The instructions may be executable by the processor to cause the apparatus to transmit, to a base station, a first pilot signal within a first set of frequency resources allocated for data communications at the UE and transmit, to the base station, a second pilot signal outside the first set of frequency resources and within a second set of frequency resources, where the first set of frequency resources is a subset of the second set of frequency resources and the first pilot signal and the second pilot signal are associated with a same data message.

Another apparatus for wireless communications at a UE is described. The apparatus may include means for transmitting, to a base station, a first pilot signal within a first set of frequency resources, where the first set of frequency resources is allocated for data communications at the UE, and means for transmitting, to the base station, a second pilot signal outside the first set of frequency resources and within a second set of frequency resources, where the first set of frequency resources is a subset of the second set of frequency resources and the first pilot signal and the second pilot signal are associated with a same data message.

A non-transitory computer-readable medium storing code for wireless communications at a UE is described. The code may include instructions executable by a processor to transmit, to a base station, a first pilot signal within a first set of frequency resources, where the first set of frequency resources is allocated for data communications at the UE, and transmit, to the base station, a second pilot signal outside the first set of frequency resources and within a second set of frequency resources, where the first set of frequency resources is a subset of the second set of frequency resources and the first pilot signal and the second pilot signal are associated with a same data message.

Some examples of the method, apparatuses, and non-transitory computer-readable medium described herein may further include operations, features, means, or instructions for receiving, from the base station, a configuration message indicating the second set of frequency resources for transmitting a set of pilot signals, where the set of pilot signals includes the first pilot signal and the second pilot signal.

Some examples of the method, apparatuses, and non-transitory computer-readable medium described herein may further include operations, features, means, or instructions for determining an allocation of the first set of frequency resources for the data communications at the UE based on the configuration message.

In some examples of the method, apparatuses, and non-transitory computer-readable medium described herein, the configuration message includes a radio resource control (RRC) configuration message, a downlink control information (DCI) message, or a combination thereof.

Some examples of the method, apparatuses, and non-transitory computer-readable medium described herein may further include operations, features, means, or instructions for transmitting, to the base station, a UE capability message indicating a first capability of the UE to transmit the data message for DPoD processing at the base station, a second capability of the UE to transmit a set of pilot signals distributed across the second set of frequency resources, or a combination thereof, where transmitting the second pilot signal may be based on the UE capability message.

Some examples of the method, apparatuses, and non-transitory computer-readable medium described herein may further include operations, features, means, or instructions for receiving, from the base station and in response to the UE capability message, a configuration message configuring the UE to implement the first capability, the second capability, or a combination thereof, where transmitting the second pilot signal may be further based on the configuration message.

In some examples of the method, apparatuses, and non-transitory computer-readable medium described herein, the first set of frequency resources includes in-band frequency resources allocated for the data communications, and the second set of frequency resources includes the in-band frequency resources and OOB frequency resources unallocated for the data communications. Some such examples of the method, apparatuses, and non-transitory computer-readable medium described herein may further include operations, features, means, or instructions for determining the OOB frequency resources based on an estimated non-linearity characteristic of the data message.

In some examples of the method, apparatuses, and non-transitory computer-readable medium described herein, determining the OOB frequency resources may include operations, features, means, or instructions for selecting the OOB frequency resources based on the estimated non-linearity characteristic of the data message satisfying an interference threshold for the OOB frequency resources.

In some examples of the method, apparatuses, and non-transitory computer-readable medium described herein, the first pilot signal and the second pilot signal may be demodulation reference signals (DMRSs) and may be transmitted concurrent with the data message, or the first pilot signal and the second pilot signal may be sounding reference signals (SRSs) and may be transmitted according to an SRS periodicity.

In some examples of the method, apparatuses, and non-transitory computer-readable medium described herein, the first set of frequency resources includes a component carrier (CC) bandwidth and the second set of frequency resources includes a set of CC bandwidths including the CC bandwidth, or the first set of frequency resources includes a sub-band of the CC bandwidth and the second set of frequency resources includes a set of sub-bands of the CC bandwidth, the CC bandwidth, a set of sub-bands of the set of CC bandwidths, or a combination thereof including the sub-band of the CC bandwidth.

Some examples of the method, apparatuses, and non-transitory computer-readable medium described herein may further include operations, features, means, or instructions for transmitting the data message using a same antenna port as the first pilot signal and the second pilot signal, a same transmit beam as the first pilot signal and the second pilot signal, or a combination thereof.

A method for wireless communications at a base station is described. The method may include allocating a first set of frequency resources for data communications of a UE, receiving, from the UE, a set of pilot signals distributed across a second set of frequency resources different from the first set of frequency resources, where the first set of frequency resources is a subset of the second set of frequency resources, performing channel estimation based on the set of pilot signals, and decoding a data message based on the channel estimation.

An apparatus for wireless communications at a base station is described. The apparatus may include a processor, memory coupled to the processor, and instructions stored in the memory. The instructions may be executable by the processor to cause the apparatus to allocate a first set of frequency resources for data communications of a UE, receive, from the UE, a set of pilot signals distributed across a second set of frequency resources different from the first set of frequency resources, where the first set of frequency resources is a subset of the second set of frequency resources, perform channel estimation based on the set of pilot signals, and decode a data message based on the channel estimation.

Another apparatus for wireless communications at a base station is described. The apparatus may include means for allocating a first set of frequency resources for data communications of a UE, means for receiving, from the UE, a set of pilot signals distributed across a second set of frequency resources different from the first set of frequency resources, where the first set of frequency resources is a subset of the second set of frequency resources, means for performing channel estimation based on the set of pilot signals, and means for decoding a data message based on the channel estimation.

A non-transitory computer-readable medium storing code for wireless communications at a base station is described. The code may include instructions executable by a processor to allocate a first set of frequency resources for data communications of a UE, receive, from the UE, a set of pilot signals distributed across a second set of frequency resources different from the first set of frequency resources, where the first set of frequency resources is a subset of the second set of frequency resources, perform channel estimation based on the set of pilot signals, and decode a data message based on the channel estimation.

Some examples of the method, apparatuses, and non-transitory computer-readable medium described herein may further include operations, features, means, or instructions for receiving, from the UE, a first data message in the first set of frequency resources, receiving, from a second UE, a second data message in a third set of frequency resources allocated for data communications of the second UE, where the third set of frequency resources at least partially overlaps with the second set of frequency resources for a set of overlapping frequency resources, and determining, based on the channel estimation, interference in the overlapping frequency resources from the first data message, where decoding the data message involves decoding the second data message from the second UE based on the determined interference from the first data message.

Some examples of the method, apparatuses, and non-transitory computer-readable medium described herein may further include operations, features, means, or instructions for transmitting, to the UE, a configuration message indicating the second set of frequency resources for transmitting the set of pilot signals.

In some examples of the method, apparatuses, and non-transitory computer-readable medium described herein, the configuration message includes an RRC configuration message, a DCI message, or a combination thereof.

Some examples of the method, apparatuses, and non-transitory computer-readable medium described herein may further include operations, features, means, or instructions for receiving, from the UE, a UE capability message indicating a first capability of the UE to transmit data messages for DPoD processing at the base station, a second capability of the UE to transmit the set of pilot signals distributed across the second set of frequency resources different from the first set of frequency resources, or a combination thereof, where performing the channel estimation may be based on the UE capability message.

Some examples of the method, apparatuses, and non-transitory computer-readable medium described herein may further include operations, features, means, or instructions for transmitting, to the UE and in response to the UE capability message, a configuration message configuring the UE to implement the first capability, the second capability, or a combination thereof, where the set of pilot signals may be received distributed across the second set of frequency resources different from the first set of frequency resources based on the configuration message.

In some examples of the method, apparatuses, and non-transitory computer-readable medium described herein, signaling associated with the data message may include a non-linearity characteristic, and the method, apparatuses, and non-transitory computer-readable medium described herein may further include operations, features, means, or instructions for performing a DPoD technique on the data message and the channel estimation and decoding the data message based on performing the DPoD technique.

In some examples of the method, apparatuses, and non-transitory computer-readable medium described herein, the first set of frequency resources includes in-band frequency resources allocated for the data communications of the UE and the second set of frequency resources includes the in-band frequency resources for the UE and OOB frequency resources unallocated for the data communications of the UE, and the method, apparatuses, and non-transitory computer-readable medium described herein may further include operations, features, means, or instructions for determining the OOB frequency resources for the UE based on an estimated non-linearity characteristic of the data communications of the UE.

In some examples of the method, apparatuses, and non-transitory computer-readable medium described herein, determining the OOB frequency resources for the UE may include operations, features, means, or instructions for selecting the OOB frequency resources for the UE based on the estimated non-linearity characteristic satisfying an interference threshold for the OOB frequency resources for the UE.

In some examples of the method, apparatuses, and non-transitory computer-readable medium described herein, the OOB frequency resources for the UE may be selected further based on the OOB frequency resources for the UE corresponding to in-band frequency resources for a second UE.

Some examples of the method, apparatuses, and non-transitory computer-readable medium described herein may further include operations, features, means, or instructions for determining the second set of frequency resources such that the second set of frequency resources includes a first frequency buffer region contiguous to a lower frequency edge of the first set of frequency resources and a second frequency buffer region contiguous to an upper frequency edge of the first set of frequency resources.

In some examples of the method, apparatuses, and non-transitory computer-readable medium described herein, the set of pilot signals may include a first set of pilot signals, and the method, apparatuses, and non-transitory computer-readable medium described herein may further include operations, features, means, or instructions for receiving, from a second UE, a second set of pilot signals distributed across at least a third set of frequency resources that at least partially overlaps with the second set of frequency resources for a set of overlapping frequency resources, where pilot signals of the first set of pilot signals and pilot signals of the second set of pilot signals may be interleaved in frequency in the set of overlapping frequency resources.

In some examples of the method, apparatuses, and non-transitory computer-readable medium described herein, performing the channel estimation may be further based on the second set of pilot signals.

In some examples of the method, apparatuses, and non-transitory computer-readable medium described herein, the set of pilot signals includes a set of DMRSs and may be received concurrently with the data message, or the set of pilot signals includes a set of SRSs and may be received according to an SRS periodicity.

DETAILED DESCRIPTION

Figure 1:
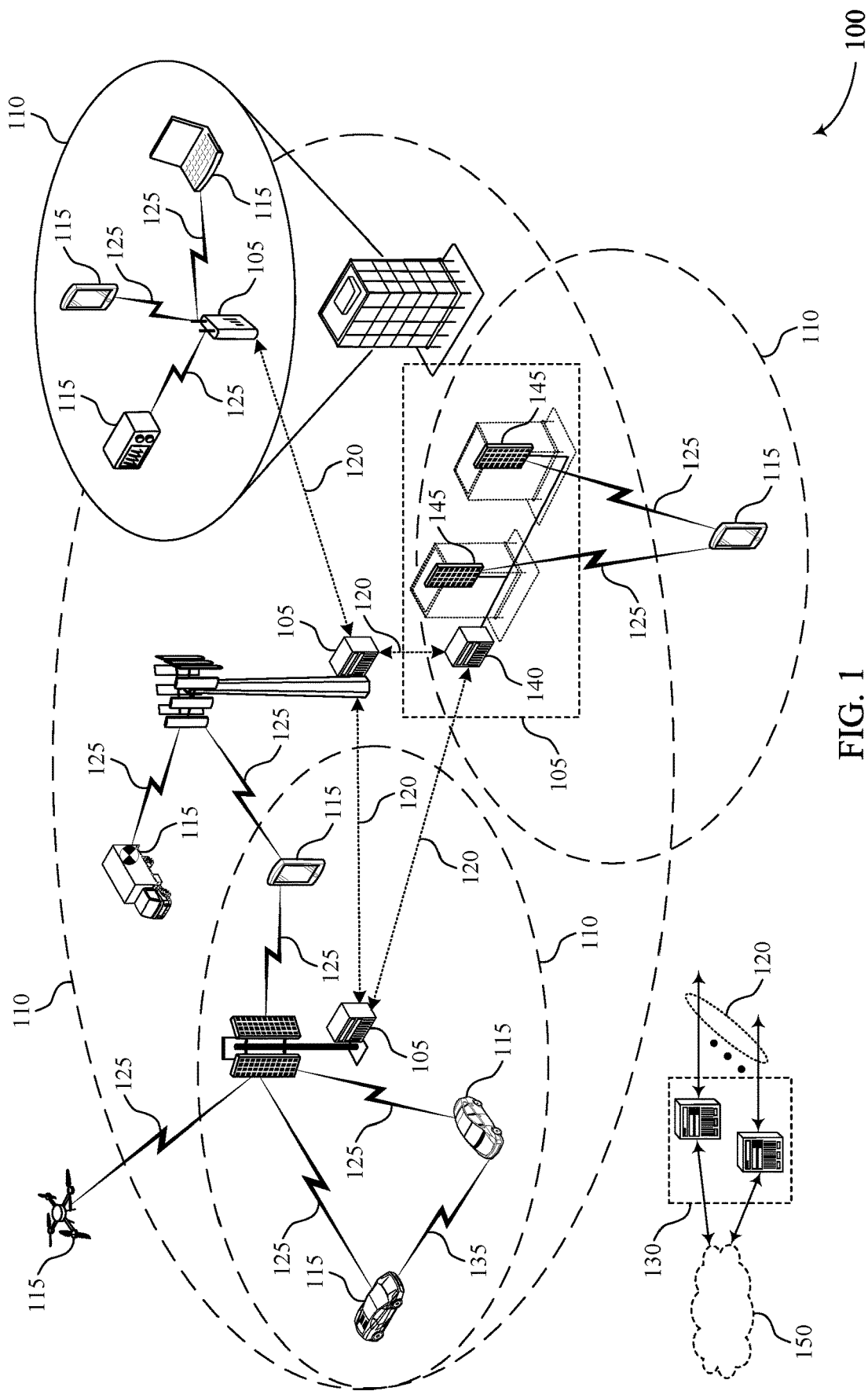
FIGS. 1 and 2 illustrate examples of wireless communications systems that support pilot signaling supporting digital post-distortion (DPoD) techniques in accordance with aspects of the present disclosure.

Some wireless communications systems may implement different types of radio frequency (RF) operations at a transmitting device. For example, a user equipment (UE) may utilize a power amplifier to increase the power of a signal transmitted to a base station. In some examples, the power amplifier may be an example of a high-power, non-linear power amplifier. That is, the relationship between the input power and the output power of the power amplifier may be non-linear. In some examples, this non-linearity may negatively impact the transmitted signal. For example, one effect of non-linearity on a signal is distortion of the signal waveform. To mitigate the effects of non-linearity or other pre-transmission impairments, a wireless device (e.g., a receiving device or a transmitting device) may implement digital post-distortion (DPoD) or digital pre-distortion (DPD). DPoD operations may take place at the receiving device (e.g., a base station) and may, for example, mitigate the effects of non-linearity. The DPoD process may be based on pilot signals received from the transmitting device (e.g., may include estimating the effects of non-linearity associated with signals from the transmitting device). For example, in the presence of a propagation channel, the DPoD process may include a combination of non-linear estimation with channel estimation based on the pilot signals received from the UE.

In some examples, the UE may process a data message for transmission to the base station using one or more RF operations that result in a non-linear signal for transmission. Due to the non-linear nature of the signal for the data message, the signal may leak into frequency resource regions located outside of frequency resources allocated to the UE for data transmission. For example, the UE may be allocated a first set of frequency resources for transmission (e.g., a set of in-band resources), but the non-linear transmission in the in-band resources may affect a second set of frequency resources external to the allocated resources (e.g., a set of out-of-band (OOB) resources). In some systems, the UE may transmit pilot signals on resources allocated to the UE (e.g., the in-band resources), and the base station receiving the pilot signals may perform DPoD processing to mitigate the effects of non-linearity. However, while the base station may acquire in-band channel knowledge based on the pilot signaling, the base station may fail to acquire OOB channel knowledge. Without OOB channel knowledge, the base station may fail to accurately measure interference in the OOB regions where the data signal from the UE may have leaked. As a result, the base station may inaccurately estimate the effects of non-linearity, potentially resulting in unreliable reception of messages from other UEs in the OOB regions.

To provide OOB channel knowledge to a base station, a UE may utilize OOB pilot signaling to support related DPoD operations at the base station. For example, the UE may process a data message for transmission (e.g., a procedure not involving DPD processing), which may introduce one or more non-linearities into signals associated with the data message. The UE may transmit the data message to a base station via a set of resources allocated to the UE (e.g., in-band resources). The processing (e.g., including power amplification) may be non-linear in nature, such that the resulting signal for the data message may potentially leak into OOB regions (e.g., external to the set of resources allocated to the UE). The UE may transmit a set of pilot signals to the base station distributed across the in-band resources and a set of OOB resources in which the effects of the non-linearity may be expected. The base station may receive the pilot signals and utilize the pilot signals to perform DPoD operations on the received data message from the UE (e.g., to handle the non-linearity at the receiver-side). That is, the base station may use the in-band and OOB pilot signals to accurately estimate the channel for in-band and OOB regions as part of the DPoD process. Accordingly, if the base station receives an additional message from another UE in an OOB region affected by the non-linear signal, the base station may effectively mitigate the interference from the non-linear signal using the OOB channel knowledge to successfully receive the additional message.

In some examples, the base station may transmit a configuration message to the UE indicating an expansion of in-band resources for pilot signaling. For example, the UE may be configured with a first set of frequency resources for data communications. The base station may transmit a configuration message instructing the UE to transmit pilot signals over a second set of frequency resources, including OOB regions where non-linearity may be expected. The second set of frequency resources may be a superset of the first set of frequency resources (e.g., the in-band resources). Based on the configuration, the UE may transmit pilot signals on in-band resources as well as OOB resources.

In some examples, the UE may transmit a capability message to the base station. The capability message may indicate whether the UE is capable of processing a data message such that a transmitted signal associated with the data message exhibits non-linear characteristics, in which case the base station may perform DPoD to process the non-linear signal. Additionally or alternatively, the capability message may indicate whether the UE is capable of transmitting pilot signals in OOB frequency resources. In some cases, based on the UE capability message, the base station may configure the UE for OOB pilot signaling.

Aspects of the disclosure are initially described in the context of wireless communications systems. Additional aspects of the disclosure are illustrated with reference to a pilot scheme, a DPoD processing scheme, and a process flow. Aspects of the disclosure are further illustrated by and described with reference to apparatus diagrams, system diagrams, and flowcharts that relate to pilot signaling supporting DPoD techniques.

FIG. 1 illustrates an example of a wireless communications system 100 that supports pilot signaling supporting DPoD techniques in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, 50, 60, 80, or 100 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Some wireless communications may utilize a multitude of different components to aid in the transmission of signals. For example, a transmitting device (e.g., a UE 115) may utilize a power amplifier to increase a signal's power. In some examples, the power amplifier may be an example of a high-power power amplifier. High-power power amplifiers may be inherently non-linear, which may negatively affect the output signal. For example, one effect of non-linearity on the signal may be distortion of the signal's waveform. In order to mitigate the negative effects of non-linearity, wireless devices in a wireless communications system 100 may implement linearization techniques such as DPD operations, DPoD operations, or a combination thereof. DPD may occur at a transmitter prior to transmitting a signal and DPoD may occur at a receiver after receiving a signal. In some examples, implementing DPD at a UE 115 may involve a significant processing overhead at the UE 115 in order to process the signal prior to transmission. For example, DPD operations may involve a computationally complex feedback process for the UE 115. In contrast, implementing DPoD at a base station 105 may reduce the processing overhead at the UE 115 for uplink transmissions (e.g., based on not performing DPD at the UE 115). In some examples, performing DPoD at a base station 105, may additionally increase power gains from a power amplifier, supporting reduced power usage at the UE 115, increased transmission power from the UE 115, or some combination thereof (e.g., based on not performing DPD at the UE 115).

In some examples, DPoD processing at a base station 105 may involve analyzing pilot signals to estimate the effects of non-linearity from a signal. Additionally, in the presence of a propagation channel (e.g., for communications by a neighboring UE 115), DPoD processing may involve analyzing the pilot signals for channel estimation. For example, a UE 115 transmitting a non-linear signal for data signaling may implement pilot signaling distributed across in-band and a set of OOB resources. The base station 105 receiving the data signaling may additionally receive the pilot signaling for channel estimation. Such channel estimation may support mitigating the negative effects of signal leakage from a non-linear signal into OOB frequency regions.

Figure 2:
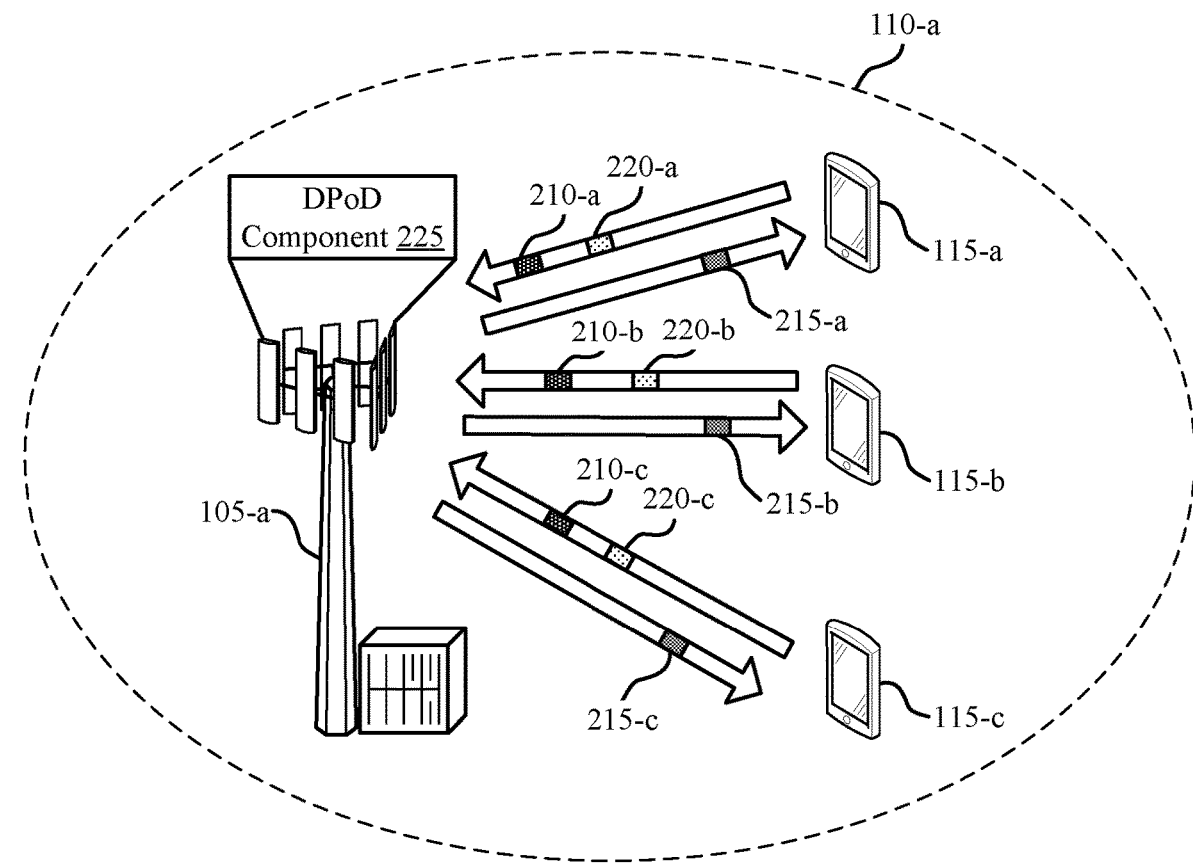
Figure 2:
Figure 2:
Figure 2:

FIG. 2 illustrates an example of a wireless communications system 200 that supports pilot signaling supporting DPoD techniques in accordance with aspects of the present disclosure. In some examples, the wireless communications system 200 may implement aspects of the wireless communications system 100. For example, the wireless communications system 200 may include a UE 115-a, a UE 115-b, a UE 115-c, and a base station 105-a, which may be examples of UEs 115 and a base station 105 as described with reference to FIG. 1. The base station 105-a may operate within a coverage area 110-a. In some examples, the base station 105-a may implement DPoD processing. In some examples, the base station 105-a implementing the DPoD processing can facilitate a reduction in the signal processing overhead of one or more of the UEs 115. In some examples, the reduction can include effectively moving some of the signal processing overhead from a UE 115 onto the base station 105-a. In this way, the UEs 115 may improve battery life and reduce signal processing associated with uplink transmissions. To support DPoD processing at the base station 105-a, the UEs 115 may implement pilot signaling over in-band and one or more OOB resources.

In some examples, the wireless communications system 200 may support processing of a message for data transmission which may result in a signal with non-linear characteristics. For example, the UEs 115 may communicate with a base station 105-a. In some examples, a UE 115 may be an example of a transmitting device and the base station 105-a may be an example of a receiving device. Alternatively or additionally, the base station 105-a may be an example of a transmitting device and a UE 115 may be an example of a receiving device. In some examples, a transmitter may utilize one or more components, such as a high-power power amplifier, to increase the power of a signal. However, high-power power amplifiers may be inherently non-linear. That is, the relationship between the input power to the power amplifier and the output power from the power amplifier may not be linear. In some examples, the effects of non-linearity may negatively affect the transmitted signal. For example, the effects of non-linearity may cause channel interference and signal distortion, potentially resulting in an increased bit-error rate (BER) and, correspondingly, a decreased channel reliability and data throughput for the wireless communications system 200.

In some examples, the wireless communications system 200 may employ linearization techniques to mitigate the effects of non-linearity. For example, a wireless device of the wireless communications system 200 may employ DPD processing, DPoD processing, or a combination thereof. The processes of DPD and DPoD may include estimating the effects of non-linearity (e.g., distortion) and applying these estimations to a signal to mitigate the effects of non-linearity. In order to estimate the effects of non-linearity in the presence of a propagation channel (e.g., where the non-linear signal or another signal is transmitted), the processes of DPD and DPoD may include channel estimation.

The process of DPD may occur at a transmitting device, whereas the process of DPoD may occur at a receiving device. For example, for uplink signaling, UEs 115 may be examples of transmitting devices and a base station 105 may be an example of a receiving device. To support DPD at a UE 115, the UE 115 may transmit pilot signals 220 (e.g., reference signals such as demodulation reference signals (DMRSs) and/or sounding reference signals (SRSs)) to the base station 105, and the base station 105 may transmit feedback regarding the one or more pilot signals 220 (e.g., in an over-the-air DPD procedure). Based on the feedback, the UE 115 may perform DPD operations to mitigate the effects of non-linearity of a data message before transmitting the data message to the base station 105. As described herein, a data message may be any transmitted message carrying information, such as a physical uplink shared channel (PUSCH) message, a physical uplink control channel message (PUCCH), or any other type of message. Additionally or alternatively, DPoD operations may take place at a receiving device. For example, for uplink signaling, a UE 115 may transmit a data message along with pilot signals 220 to the base station 105, and the base station 105 may perform DPoD operations based on the pilot signals 220 to mitigate the effects of non-linearity on the received data message. In some examples, DPoD operations may be used for uplink signaling, while DPD operations may not be used, to reduce the processing overhead at the UE 115. For example, because DPD operations depend on feedback from the receiving device and additional processing at the transmitting device, performing the processing at the receiving device (e.g., in the case of DPoD without DPD) may effectively move a significant portion of the processing to the receiving device. To reduce the processing overhead at UEs 115, in some cases, the base station 105-*a* may perform DPD for downlink transmissions, perform DPoD for uplink transmissions, or both. Additionally, DPD operations may limit a maximum transmit power more than DPoD operations, because the effects of non-linearity are compensated for before the data message is transmitted.

In some examples, a wireless communications system 200 may implement DPoD processing. For example, the base station 105-*a* may be an example of a receiver using a DPoD component 225 and the UEs 115 may be examples of transmitters for uplink signaling. In some examples, a UE 115 may be configured with a component carrier (CC) to use for communications with the base station 105-*a*. For example, a UE 115-*a* may be configured with a first CC, a UE 115-*b* may be configured with a second CC, and a UE 115-*c* may be configured with a third CC. In some examples, the first CC, the second CC, and the third CC may be different from each other (e.g., span different frequencies). In some examples, the first CC, the second CC, and the third CC may overlap (e.g., share at least a portion of frequencies). In some examples, the UE 115-*a* may transmit a data message and pilot signals 220 to the base station 105-*a* via the first CC. As described herein, channel estimation may be combined with non-linear estimation during DPoD processing in the presence of a propagation channel. As such, the base station 105-*a* may receive pilot signals 220 via the first CC from the UE 115-*a* and perform in-band channel estimation. That is, the base station 105-*a* may acquire channel knowledge associated with in-band resources. As described herein, in-band resources for a UE 115 may refer to resources allocated for data communications by the UE 115. The in-band resources may refer to a carrier bandwidth or a subset of resources in a carrier bandwidth (e.g., allocated for transmitting a data message).

In some cases, transmitting the data message in-band without performing DPD at the UE 115-*a* may cause the signal indicating the data message to leak into OOB frequencies due to non-linearity characteristics of the signal. As described herein, OOB resources for a UE 115 may refer to resources unallocated for data communications by the UE 115. For example, the OOB resources may refer to resources in other carrier bandwidths or resources in the same carrier bandwidth as the in-band resources, but not allocated for transmitting the data message. The UE 115-*a* may transmit the signal associated with the data message to the base station 105-*a* via the first CC, and the base station 105-*a* may receive the data message on the first CC. In some examples, the signal may leak into CCs allocated to different UEs 115. For example, the signal may leak into at least a portion of resources located within the second CC allocated to the UE 115-*b*. Because the base station 105-*a* receives pilot signals 220-*a* from the UE 115-*a* via in-band resources (e.g., in the first CC), the base station 105-*a* may acquire channel knowledge of the in-band resources. However, if the base station 105-*a* does not receive pilot signals 220-*a* in the affected OOB resources, the base station 105-*a* may fail to mitigate OOB interference. This may potentially cause the base station 105-*a* to fail to fully mitigate the effects of non-linearity in OOB resources, reducing the reliability of successfully receiving data messages from the UE 115-*b* or the UE 115-*c* in the OOB resources. Although described herein with respect to a first CC, second CC, and third CC, it is to be understood that a UE 115 may be configured with multiple CCs or a subset of a CC for communications.

The wireless communications system 200 may support OOB pilot signals 220 during DPoD operations. That is, the UE 115-*a* may transmit pilot signals 220-*a* distributed across in-band frequency resources and a set of OOB frequency resources. For example, the UE 115-*a* may transmit DMRSs in in-band and OOB resources with a data message transmitted in the in-band resources. Accordingly, a UE 115 may transmit DMRSs in a different set of resources (e.g., a wider frequency band) than the corresponding uplink signal (e.g., an uplink data signal, an uplink control signal, an uplink feedback signal, etc.). Additionally or alternatively, the UE 115-*a* may transmit SRSs in the in-band and OOB resources based on a resource configuration for the UE 115-*a*. Accordingly, a UE 115 may transmit SRSs in a different set of resources (e.g., a wider frequency band) than a configured set of resources for uplink transmissions (e.g., an active uplink BWP, an active uplink resource bandwidth, or any other configured set of uplink frequency resources). The base station 105-*a* including a DPoD component 225 may perform OOB channel estimation to accurately estimate the effects of non-linearity using the OOB pilot signals 220.

In some examples, a UE 115 may transmit a capability message 210 to the base station 105-*a*. For example, the UE 115-*a* may transmit a capability message 210-*a*, the UE 115-*b* may transmit a capability message 210-*b*, and the UE 115-*c* may transmit a capability message 210-*c* to the base station 105-*a*. In some examples, a capability message 210 may indicate to the base station 105-*a* whether the corresponding UE 115 supports OOB pilot signaling. Additionally or alternatively, the capability message 210 may indicate whether the corresponding UE 115 is capable of processing a data message such that a signal associated with the data message is a non-linear signal (e.g., processing not involving DPD). In some cases, a data message for which associated signaling is non-linear may be referred to as compressed data message. For example, such information may be indicated in one or more information elements (IEs) included in a UE capability message. In some examples, the UE capability message may be an example of an RRC message. In some cases, the UE 115-*a*, the UE 115-*b*, and the UE 115-*c* may indicate to the base station 105-*a* power thresholds for which the UE 115-*a*, the UE 115-*b*, and the UE 115-*c* may transmit linear or non-linear signals for data messages.

In some examples, the base station 105-*a* may transmit resource configurations 215 to the UEs 115. A resource configuration 215 may indicate a wider frequency band for UE 115s to use for pilot signaling than for data signaling. In some examples, the wider frequency band may be based on in-band frequencies (e.g., assigned resources and/or CCs). For example, the base station 105-*a* may indicate a frequency span in which a UE 115 may extend assigned in-band resources for pilot signaling. Additionally or alternatively, the wider frequency band may be based on an estimated non-linear characteristic of a message. For example, the base station 105-*a*, a UE 115, or both may estimate a set of OOB frequency resources which may be significantly affected (e.g., experience interference above a pre-configured, semi-static, or dynamic interference threshold) by a non-linear signal transmitted in in-band resources. In some examples, the base station 105-*a* may transmit a resource configuration 215-*a* to the UE 115-*a*, and the UE 115-*a* may extend pilot resources to include the first CC and at least a portion of the second CC (e.g., where non-linearity is expected). Similarly, the base station 105-*a* may transmit a resource configuration 215-*b* to the UE 115-*b*, and the UE 115-*b* may extend pilot resources to include the second CC and at least a portion of the first CC and a portion of the third CC (e.g., where non-linearity is expected). Similarly, the base station 105-*a* may transmit a resource configuration 215-*c* to the UE 115-*c*, and the UE 115-*c* may extend pilot resources to include the third CC and at least a portion of the second CC (e.g., where non-linearity is expected). In some examples, a resource configuration 215 may be signaled to a UE 115 via RRC signaling, downlink control information (DCI) signaling, or a combination thereof.

In some examples, the base station 105-*a* may receive in-band and OOB pilot signals 220 from UEs 115 and may perform DPoD. For example, the UE 115-*a* may transmit pilot signals 220-*a* on frequency resources located within the first CC and at least a portion of the second CC. The UE 115-*b* may transmit pilot signals 220-*b* on frequency resources located within the second CC as well as resources located within at least a portion of the first CC and at least a portion of the third CC. The UE 115-*c* may transmit pilot signals 220-*c* on frequency resources located within the third CC and at least a portion of the second CC. Based on the received pilot signals 220, the base station 105-*a* may estimate the effects of non-linearity using a DPoD component 225. For example, the base station 105-*a* may perform channel estimation using OOB pilot signals 220-*a* in the portion of the second CC to mitigate interference from a first data message received from the UE 115-*a* in the first CC on a second data message received from the UE 115-*b* in the second CC. Similarly, the base station 105-*a* may perform channel estimation using OOB pilot signals 220-*b* in the portion of the first CC to mitigate interference from the second data message received from the UE 115-*b* in the second CC on the first data message received from the UE 115-*a* in the first CC. In this way, the OOB pilot signaling may support reliable communications in multi-UE systems (e.g., systems implementing multi-user multiple input, multiple output (MU-MIMO) on the uplink) in the presence of non-linear signal transmissions.

Figure 3A:
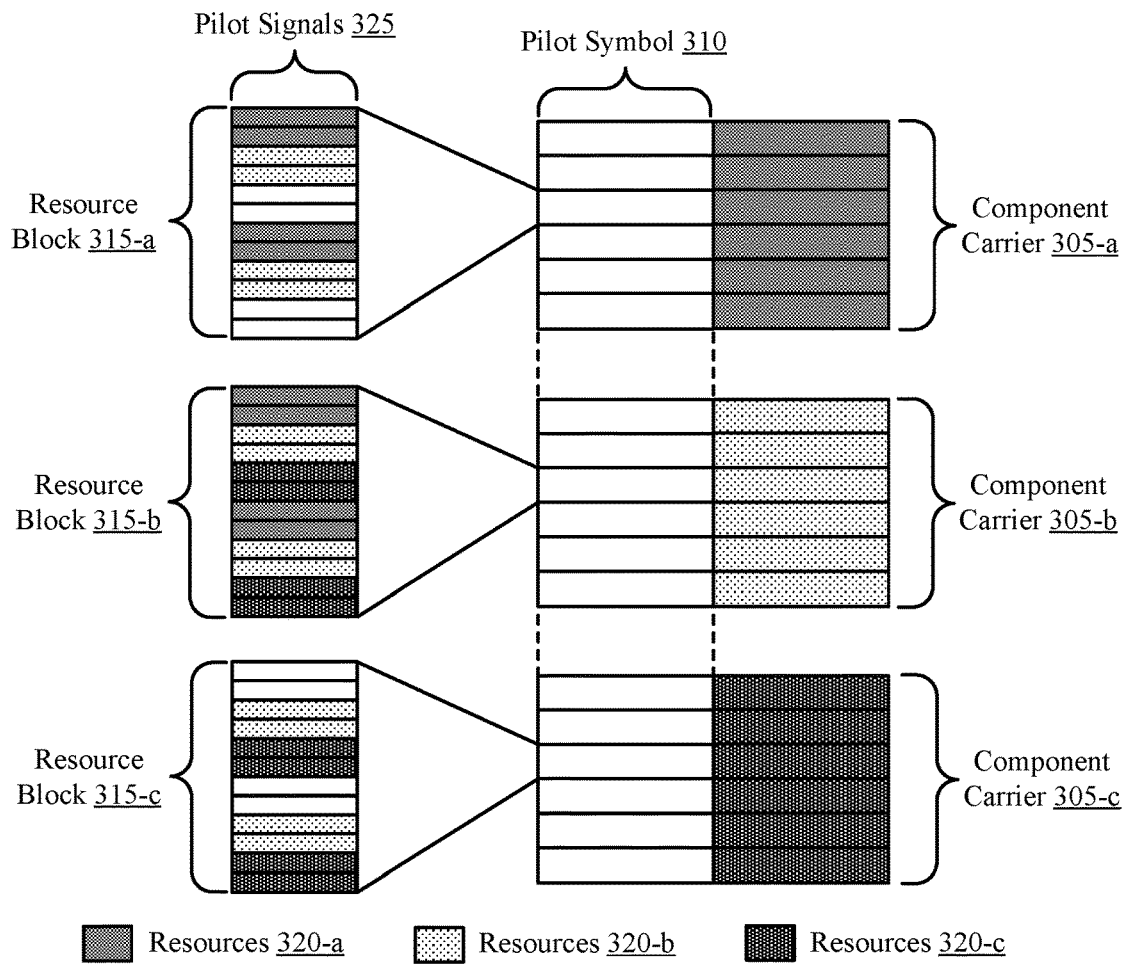
FIG. 3A illustrates an example of a pilot scheme that supports pilot signaling supporting DPoD techniques in accordance with aspects of the present disclosure.

FIG. 3A illustrates an example of a pilot scheme 301 that supports pilot signaling supporting DPoD techniques in accordance with aspects of the present disclosure. In some examples, the pilot scheme 301 may implement aspects of a wireless communications system 100 or 200 as described with reference to FIGS. 1 and 2. For example, UEs 115 may implement the pilot scheme 301 to transmit OOB pilot signaling that supports DPoD techniques at a base station 105.

In some examples, a base station 105 may communicate with multiple UEs 115 (e.g., a UE 1, a UE 2, and a UE 3). For uplink transmissions, the base station 105 may be an example of a receiving device and the UE 1, the UE 2, and the UE 3 may be examples of transmitting devices. In some examples, the UE 1 may be configured with a CC 305-*a*. Within the CC 305-*a* are resources 320-*a* allocated to the UE 1 for communications with the base station. In some cases, the UE 1 may be configured with a subset of resources from the CC 305-*a* or from multiple CCs 305 for uplink transmission, which may be referred to as the "in-band" resources for the UE 1. Additionally, the UE 2 may be configured with a CC 305-*b* and the UE 3 may be configured with a CC 305-*c*. Within the CC 305-*b* are resources 320-*b* allocated to the UE 2 for communications with the base station, and the CC 305-*c* may include resources 320-*c* allocated to the UE 3 for communications with the base station. Similar to the CC 305-*a*, the set of frequency resources represented by the CC 305-*b*, the CC 305-*c*, or both as illustrated in FIG. 3A may correspond to a subset of a carrier bandwidth, a full carrier bandwidth, or resources spanning multiple carriers. In some examples, the CC 305-*a*, the CC 305-*b*, and the CC 305-*c* may partially or fully overlap (e.g., share at least a portion of frequency resources) or the CC 305-*a*, the CC 305-*b*, and the CC 305-*c* may be distinct in frequency (e.g., span different frequency resources). In some examples, each CC 305 may have dedicated resources (e.g., time resources, frequency resources, or both) for uplink pilot signal transmission. For example, the UE 1, the UE 2, and the UE 3 may transmit one or more pilot signals in dedicated pilot symbols 310. A pilot symbol 310 may include multiple resource blocks, where each resource block contains multiple resource elements. For example, a pilot symbol 310 may include multiple resource blocks 315, such as a resource block 315-*a*, within the CC 305-*a*, multiple resource blocks 315, such as a resource block 315-*b*, within the CC 305-*b*, and multiple resource blocks 315, such as a resource block 315-*c*, within the CC 305-*c*.

In some examples, the base station may configure the UE 1, the UE 2, and the UE 3 with a wider frequency band for pilot signaling than for uplink communications. In some examples, the wider frequency band may be based on in-band frequencies (e.g., assigned resources, such as assigned CCs 305). For example, the base station may indicate a frequency span in which the UEs 115 may extend in-band resources for pilot signaling. Additionally or alternatively, the wider frequency band may be based on an estimated non-linear characteristic of a message, a resource allocation for another UE, or a combination thereof. In some examples, the UE 1 may receive a resource configuration message from the base station and may extend resources for pilot signaling to include a portion of the CC 305-*b* (e.g., in addition to in-band resources in the CC 305-*a*). Similarly, the UE 2 may receive a resource configuration message from the base station and may extend resources for pilot signaling to include a portion of the CC 305-*a* and a portion of the CC 305-*c* (e.g., in addition to in-band resources in the CC 305-*b*). Similarly, the UE 3 may receive a resource configuration message from the base station and may extend resources for pilot signaling to include a portion of the CC 305-*b* (e.g., in addition to in-band resources in the CC 305-*c*).

In some examples, the UE 1, the UE 2, and the UE 3 may transmit one or more pilot signals 325 to the base station on in-band and OOB frequencies (e.g., indicated by a configuration message or otherwise determined by the UE). For example, the UE 1 may transmit pilot signals 325 on resources 320-*a* allocated to the UE 1 within a resource block 315-*a* and a resource block 315-*b*, the UE 2 may transmit pilot signals 325 on resources 320-*b* allocated to the UE 2 within a resource block 315-*a*, a resource block 315-*b*, and a resource block 315-*c*, and the UE 3 may transmit pilots signals 325 on resources 320-*c* allocated to the UE 3 within a resource block 315-*b* and a resource block 315-*c*. The base station may use the pilot signals 325 received from the UE 1, the UE 2, and the UE 3 to estimate the channel for in-band and OOB resources for each of the UE 1, the UE 2, and the UE 3 during DPoD operations.

Figure 3B:
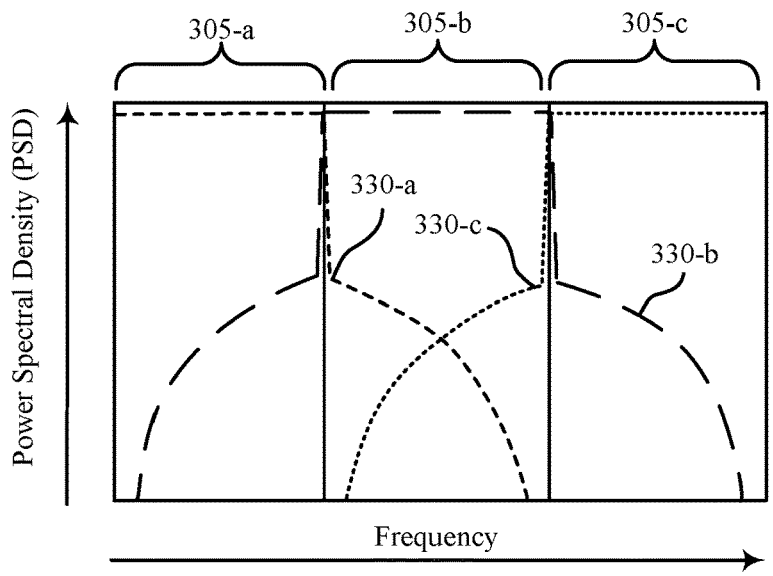
FIG. 3B illustrates an example of an out-of-band (OOB) signal interference graph that supports pilot signaling supporting DPoD techniques in accordance with aspects of the present disclosure.

FIG. 3B illustrates an example of an OOB signal interference graph 302 that supports pilot signaling supporting DPoD techniques in accordance with aspects of the present disclosure. In some examples, the OOB signal interference graph 302 may represent aspects of a wireless communications system 100 or 200 as described with reference to FIGS. 1 and 2. For example, UEs 115 may implement a pilot scheme 301 to support a base station 105 mitigating the OOB interference represented by the OOB signal interference graph 302.

In some examples, a base station 105 may communicate with multiple UEs 115 (e.g., a UE 1, a UE 2, and a UE 3) as described with reference to FIG. 3A. Without DPD operations performed at the UEs, data messages transmitted from the UE 1, the UE 2, and the UE 3 to the base station may leak into OOB frequencies due to non-linear signal characteristics. For example, the UE 1 may be configured with a CC 305-a, the UE 2 may be configured with a CC 305-b, and the UE 3 may be configured with a CC 305-c. As such, the data allocations for neighboring UEs may be interlaced for multi-user uplink. In some examples, the UE 1 may transmit a data signal via the CC 305-a which, due to non-linearity, may leak into resources located within the CC 305-b. For example, the power spectral density (PSD) 330-a of the UE 1's data signal may be non-zero (e.g., a non-negligible value) in portions of the CC 305-b. Similarly the PSD 330-b for a data signal transmitted by the UE 2 may leak into the CC 305-a and the CC 305-c, and the PSD 330-c for a data signal transmitted by the UE 3 may leak into the CC 305-b.

To mitigate the effects of channel interference due to the OOB PSDs 330, the UE 1, the UE 2, and the UE 3 may be configured to transmit pilot signals on OOB frequencies as described with reference to FIGS. 2 and 3A. That is, the UE 1 may transmit pilot signals to the base station on resources within the CC 305-a as well as resources within the CC 305-b. In some cases, the resources within the CC 305-b for the UE 1's pilot signaling may be based on a configured frequency buffer around the UE 1's in-band resources. For example, the UE 1 may determine the edges of the in-band bandwidth and may transmit pilot signaling in a specific number of OOB frequency resources extended onto each edge of the in-band bandwidth. Additionally or alternatively, the UE 1, the base station, or both may determine the resources within the CC 305-b for the UE 1's pilot signaling based on an estimation of which resources may be affected by the non-linearity of the UE 1's data signal. For example, the UE 1 may transmit pilot signaling in OOB frequency resources in which the PSD 330-a (or an estimated PSD 330-a) is greater than a threshold PSD value. Additionally or alternatively, the UE 1, the base station, or both may determine the resources within the CC 305-b for the UE 1's pilot signaling based on other UE resource allocations. For example, if the OOB resources which may be affected by the UE 1's data signaling are not allocated for another UE, the UE 1 may refrain from transmitting pilot signals in these OOB resources. However, if the OOB resources which may be affected by the UE 1's data signaling are allocated for another UE (e.g., such as the CC 305-b allocated to the UE 2), the UE 1 may be configured to transmit pilot signaling in the OOB resources.

Similarly, the UE 2 may transmit pilot signals to the base station in resources within the CC 305-b as well as resources within the CC 305-a and the CC 305-c, and the UE 3 may transmit pilot signals to the base station in resources located within the CC 305-c as well as resources within the CC 305-b. As such, the base station may estimate the channel associated with the in-band and OOB regions (e.g., where the signals may have leaked) and, accordingly, may accurately estimate the effects of non-linearity via DPoD processing. For example, to successfully receive and decode the data signal received from the UE 2 in the CC 305-b, the base station may use pilot signaling from the UE 1 to mitigate the OOB PSD 330-a from the UE 1's data signaling in the CC 305-a and may use pilot signaling from the UE 2 to mitigate the OOB PSD 330-c from the UE 3's data signaling in the CC 305-c. In this way, the base station may effectively isolate the PSD 330-b in the CC 305-b for the UE 2's data signaling in the CC 305-b, may perform DPoD processing on the data signaling to account for the non-linearity of the signal waveform, and may decode the information in the data message based on the signal waveform. The base station may use the in-band and OOB pilot signals from one or more UEs to determine the channel from multiple transmission sources (e.g., UEs) in the uplink.

Figure 4:
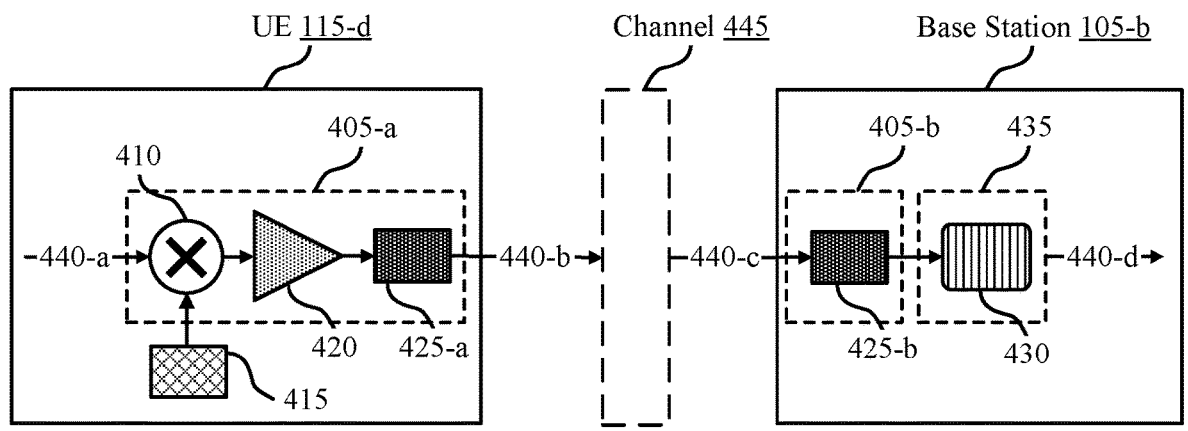
FIG. 4 illustrates an example of a DPoD processing scheme that supports pilot signaling supporting DPoD techniques in accordance with aspects of the present disclosure.
Figure 4:
Figure 4:
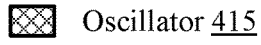
Figure 4:
Figure 4:
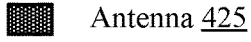
Figure 4:

FIG. 4 illustrates an example of a DPoD processing scheme 400 that supports pilot signaling supporting DPoD techniques in accordance with aspects of the present disclosure. In some examples, the DPoD processing scheme 400 may implement aspects of a wireless communications system 100, a wireless communications system 200, a pilot scheme 301, an OOB signal interference graph 302, or a combination thereof. For example, the DPoD processing scheme 400 may include a UE 115-d and a base station 105-b, which may be examples of a UE 115 and a base station 105 as described with reference to FIGS. 1, 2, 3A, and 3B.

In some examples, the UE 115-d may include a transmitter, which—in some cases—may be an aspect of a transceiver. The UE 115-d may include multiple components for different purposes. For example, the UE 115-d may include an RF component 405-a. The RF component 405-a may include a mixer 410, an oscillator 415, a power amplifier 420, an antenna 425, or any combination of these or additional components. The oscillator 415 may be an example of a local oscillator (LO). The power amplifier 415 may be an example of a high-power power amplifier and may exhibit non-linear characteristics. The base station 105-b may include a receiver with an RF component 405-b and a front-end (FE) component 435. The RF component 405-b may include an antenna 425-b and the FE component 435 may include a DPoD component 430. In some cases, the FE component 435 may further include a band-pass filter, an RF amplifier, an LO, a mixer, or any combination of these or additional components.

In some examples, the UE 115-d may transmit a data message 440 to the base station 105-b. To transmit the data message 440, the data message 440-a (e.g., a set of bits representing the data message 440-a) may pass through the mixer 410. In some examples, the mixer 410 may work in conjunction with the oscillator 415 to change the frequency of the data message 440-a. Additionally, the data message 440-a may pass through the power amplifier 420 and an antenna 425-a (or a set of antennas) may transmit the resulting signal representing the data message 420-b. The power amplifier 420 may be used to increase the power of the signal representing the data message 440-a, and the antenna 425-a may convert the amplified signal to radio waves. In some examples, the power amplifier 420 may be a high-power power amplifier. In some examples, passing the data message 440-a through the power amplifier 420 may result in a signal representing the data message 440-b, where the signal representing the data message 440-b may exhibit non-linear characteristics. The transmitted signal Tx(t) representing the data message 440-b may be expressed by Equation 1:

$$Tx(t)=G \cdot x(t)+NL(x(t)) \quad (1)$$

where G represents a linear operator, x(t) represents the data message 440-a (e.g., an input signal to the power amplifier), and NL represents the effects of non-linearity such as distortion on the input signal.

In some examples, the UE 115-d may transmit the signal via a channel 445 (e.g., an uplink channel, such as a PUCCH, a PUSCH, or any other channel). In the absence of a propagation channel, the resulting data message 440-c may be expressed by Equation 2:

$$r(t)=Tx(t)+n(t) \quad (2)$$

where n(t) is thermal noise and r(t) is the received signal. However, in the presence of a propagation channel, interference may affect the data message 440-b. As described herein, without DPD, one or more signals may leak into OOB resources due to non-linearity. As such, the received signal over the channel for the data message 440-c may include in-band interference as well as OOB interference (e.g., from one or more other signals), resulting in the data message 440-c. By normalizing the gain, G, to a value of 1, the received signal in the frequency domain, r(f)=FT (r(t)), may be expressed by Equation 3:

$$r(f)=h(f)\cdot Tx(f)+n(f)=h(f)\cdot x(f)+n(f)+h(f)\cdot FT(NL(x(t))) \quad (3)$$

where FT represents a Fourier transform (e.g., transformation to the frequency domain), h is based on the channel 445, and f is the OOB and in-band frequency in which distortion occurs. In this way, the base station 105-b may use both an estimated signal at the transmitter and a channel impulse response to compensate for the power amplifier non-linearity in the received signal. In some cases, the channel estimates may be based on pilot signals received in the same frequency band as the data message 440-c, as described herein with reference to FIGS. 2, 3A, and 3B. This may include in-band pilot signals, OOB pilot signals, or a combination thereof.

The base station 105-b may receive the signal representing the data message 440-c. That is, the data message 440-c may pass through the antenna 425-b and the base station 105-b may use the DPoD component 430 to process the received signal. At the DPoD component 430, the signal may undergo DPoD processing which may include non-linear estimation in combination with channel estimation. The DPoD processing may account for the distortion in the signal, the interference to the signal, or both. Using the DPoD component 430, the base station 105-b may decode the signal to determine the data message 440-d (e.g., the information bits used to generate the data message 440-a at the transmitter-side).

Figure 5:
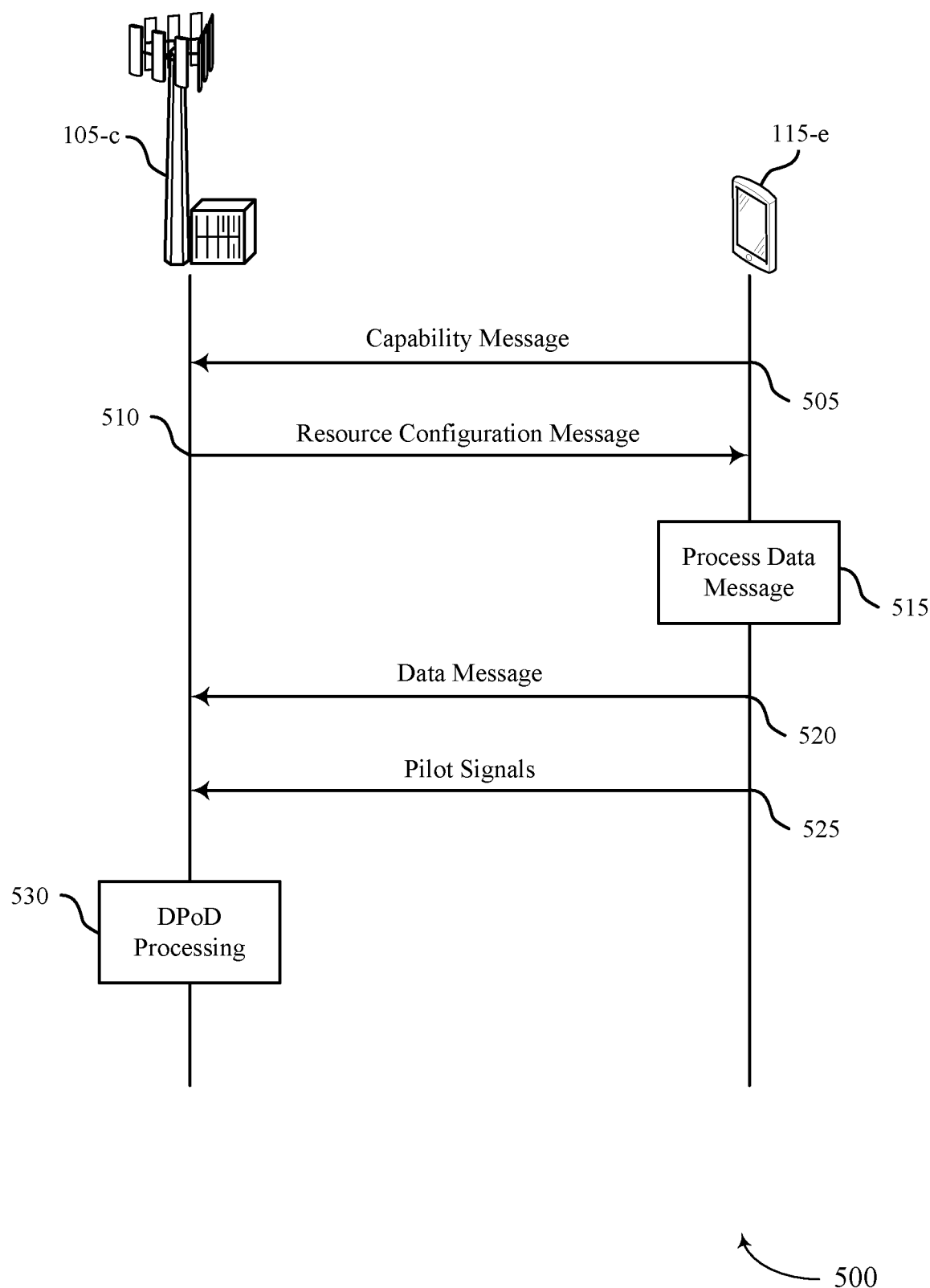
FIG. 5 illustrates an example of a process flow that supports pilot signaling supporting DPoD techniques in accordance with aspects of the present disclosure.

FIG. 5 illustrates an example of a process flow 500 that supports pilot signaling supporting DPoD techniques in accordance with aspects of the present disclosure. In some examples, the process flow 500 may implement aspects of a wireless communications system 100, a wireless communications system 200, a pilot scheme 301, an OOB signal interference graph 302, a DPoD processing scheme 400, or a combination thereof. For example, the process flow 500 may include a UE 115-e and a base station 105-c, which may be examples of a UE 115 and a base station 105 as described with reference to FIGS. 1 through 4. For uplink communications, the UE 115-e may be an example of a transmitter and the base station 105-c may be an example of a receiver. In some examples, the UE 115-e may utilize non-linear components such as a power amplifier to transmit a data message to the base station 105-c. Non-linearity may cause the transmitted signal to leak into OOB frequencies (e.g., resources outside of the resources allocated for the data transmission by the UE 115-e). In some examples, the UE 115-e may transmit pilot signals in the OOB resources to support OOB channel estimation by the base station 105-c to mitigate the effects of the non-linearity of the data message. The base station 105-c and the UE 115-e may implement one or more techniques described herein to mitigate OOB interference during DPoD operations. Alternative examples of the following may be implemented, where steps are performed in a different order than described or are not performed at all. In some cases, steps may include additional features not mentioned below, or further steps may be added.

At 505, the UE 115-e may transmit a capability message to the base station 105-c. In some examples, the capability message may indicate whether the UE 115-e is capable of processing a data message such that over-the-air signaling associated with the data message includes one or more non-linearities (e.g., processing not involving DPD that results in a non-linear RF signal). In some examples, the capability indicator may indicate if the UE 115-e is capable of transmitting pilot signals via OOB resources.

At 510, the base station 105-c may transmit a resource configuration message to the UE 115-e. The resource configuration message may indicate to the UE 115-e a set of OOB resources for transmitting OOB pilot signals. For example, the resource configuration message may instruct the UE 115-e to expand the resources for transmitting pilot signaling from the resources for transmitting uplink messages to include additional regions where non-linearity may be expected (e.g., where the non-linear effects may cause non-negligible interference). In some examples, the resource configuration message may be an RRC configuration message, DCI message, or any other downlink message. In some examples, the resource configuration message may be based on the UE capability message received at 505.

At 515, the UE 115-e may process a data message for transmission, where the processing may result in a non-linear signal for the data message (e.g., an over-the-air signal including one or more non-linear characteristics). For example, the data message may pass through a high-power power amplifier resulting in power gain and causing a non-linear increase in output power. That is, the data message may exhibit non-linear characteristics based on the processing (e.g., power amplification) of the message. However, the processing may not include a DPD process, and thus may not mitigate one or more non-linear characteristics at the transmitter-side.

At 520, the UE 115-e may transmit the data message to the base station 105-c. The UE 115-e may be configured with a CC (e.g., span of frequency resources allocated to the UE 115-e) and may transmit the data message on resources located within the CC. As described above, the data message may exhibit non-linear characteristics. The non-linear characteristics of the data message may cause distortion to leak into OOB frequencies (e.g., frequencies resources located outside the resources allocated for data communications).

At 525, the UE 115-e may transmit two or more pilot signals to the base station 105-c. In some examples, the UE 115-e may transmit the pilot signals (e.g., DMRSs, SRSs, etc.) on resources based on the configuration message received at 510. The UE 115-e may transmit the pilot signals in in-band resources and OOB resources. For example, the pilot signals may be transmitted in multiple resource elements of one or more pilot symbols, where the resource elements may be distributed across the in-band resources and a set of OOB resources (e.g., frequency resources unallocated for the data communications). In some cases, the UE 115-e may transmit the data message (e.g., in-band) and the pilot signals (e.g., in-band and OOB) using a same transmission port (e.g., antenna port configuration), a same uplink transmit beam, or both.

At 530, the base station 105-*c* may perform DPoD operations to mitigate the effects of non-linearity on the message received from the UE 115-*e* at 520. In some examples, DPoD operations may involve channel estimation. The base station 105-*c* may use the pilot signals received at 525 to estimate the channel for in-band resources (e.g., frequency resources allocated for the UE 115-*e* to transmit data) and OOB resources (e.g., frequency resources unallocated for the UE 115-*e* to transmit data that may be affected by the non-linear characteristics of the transmitted data).

Figure 6:
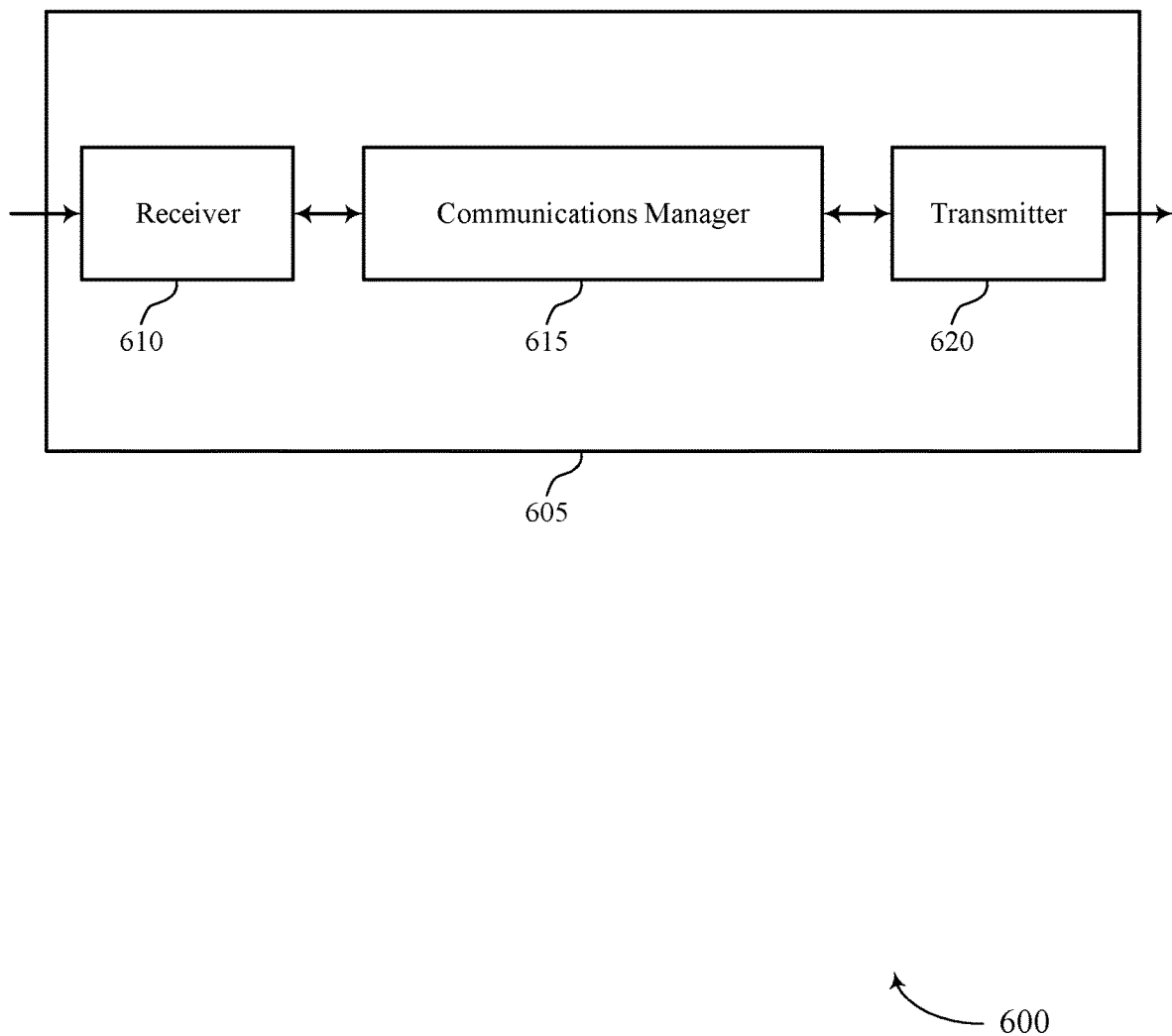
FIGS. 6 and 7 show block diagrams of devices that support pilot signaling supporting DPoD techniques in accordance with aspects of the present disclosure.

FIG. 6 shows a block diagram 600 of a device 605 that supports pilot signaling supporting DPoD techniques in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to pilot signaling supporting DPoD techniques, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may be implemented at a UE. The communications manager 615 may transmit, to a base station, a first pilot signal within a first set of frequency resources, where the first set of frequency resources is allocated for data communications at the UE, and may transmit, to the base station, a second pilot signal outside the first set of frequency resources and within a second set of frequency resources. The first set of frequency resources may be a subset of the second set of frequency resources, and the first pilot signal and the second pilot signal may be associated with a same data message. The communications manager 615 may be an example of aspects of the communications manager 910 described herein. In some examples, one or more aspects of the communications manager 615 may be implemented by—or in conjunction with—the receiver 610, the transmitter 620, or a combination thereof.

The actions performed by the communications manager 615 as described herein may be implemented to realize one or more potential advantages. For example, transmitting OOB pilot signals may allow for a base station 105 to account for OOB interference caused by non-linear signals when performing DPoD processing. For example, the base station 105 may estimate a channel based on the OOB interference, aiding in the reception of signals affected by non-linear distortion. Such processes may support multiple UEs 115 concurrently communicating in the uplink without degrading reception reliability at the base station 105 implementing DPoD. A UE 115 in such a system (e.g., a device 605) may significantly reduce power consumption at a power amplifier (e.g., to transmit at a same transmit power level as compared to a DPD process) or may increase the rate of communication for the power amplifier (e.g., by supporting transmission at a higher transmit power level as compared to a DPD process using the same power amplifier) . Additionally or alternatively, the UE 115 (e.g., the device 605) may increase power gain (e.g., by multiple decibels (dBs) of emitted power) while maintaining the same link quality conditions by not performing DPD and transmitting OOB pilot signals.

Implementing DPoD processing on the base station-side—in place of DPD processing on the UE-side—may decrease the processing overhead at the UE 115 (e.g., the device 605) for uplink transmissions. As such, a processor of the device 605 (e.g., a processor controlling the receiver 610, the communications manager 615, the transmitter 620, or some combination thereof) may reduce processing resources used for uplink transmissions. Additionally, using the OOB pilot signals to improve uplink transmission reliability may potentially reduce the number of retransmissions performed in the system, allowing the UE to reduce the number of times the processor ramps up processing power and turns on processing units to handle uplink retransmissions.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
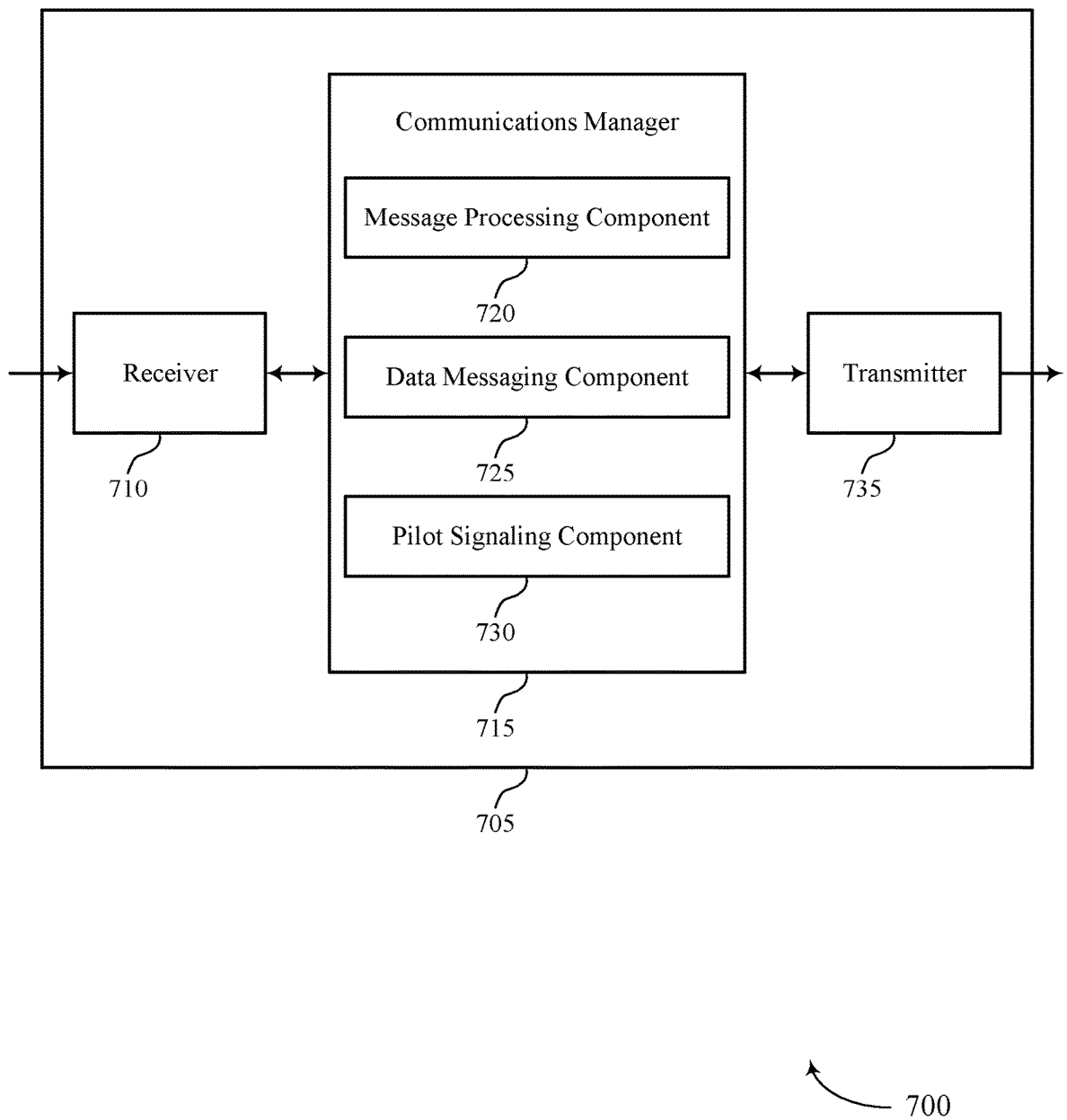

FIG. 7 shows a block diagram 700 of a device 705 that supports pilot signaling supporting DPoD techniques in accordance with aspects of the present disclosure. The device 705 may be an example of aspects of a device 605 or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to pilot signaling, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a message processing component 720, a data messaging component 725, and a pilot signaling component 730. The communications manager 715 may be an example of aspects of the communications manager 910 described herein. In some examples, functions described herein with respect to the communications manager 715 may be performed by the receiver 710, the transmitter 735, or a combination thereof. The communications manager 715 may be implemented at a UE.

The message processing component 720 may process a data message for transmission, where a signal associated with the data message may include non-linear characteristics based on the processing. The data messaging component 725 may transmit, to a base station, the data message in a first set of frequency resources allocated for data communications at the UE. The pilot signaling component 730 may transmit, to the base station, a first pilot signal within a first set of frequency resources, where the first set of frequency resources is allocated for data communications at the UE. The pilot signaling component 730 may additionally transmit, to the base station, a second pilot signal outside the first set of frequency resources and within a second set of frequency resources. The first set of frequency resources may be a subset of the second set of frequency resources, and the first pilot signal and the second pilot signal may be associated with a same data message (e.g., the transmitted data message).

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
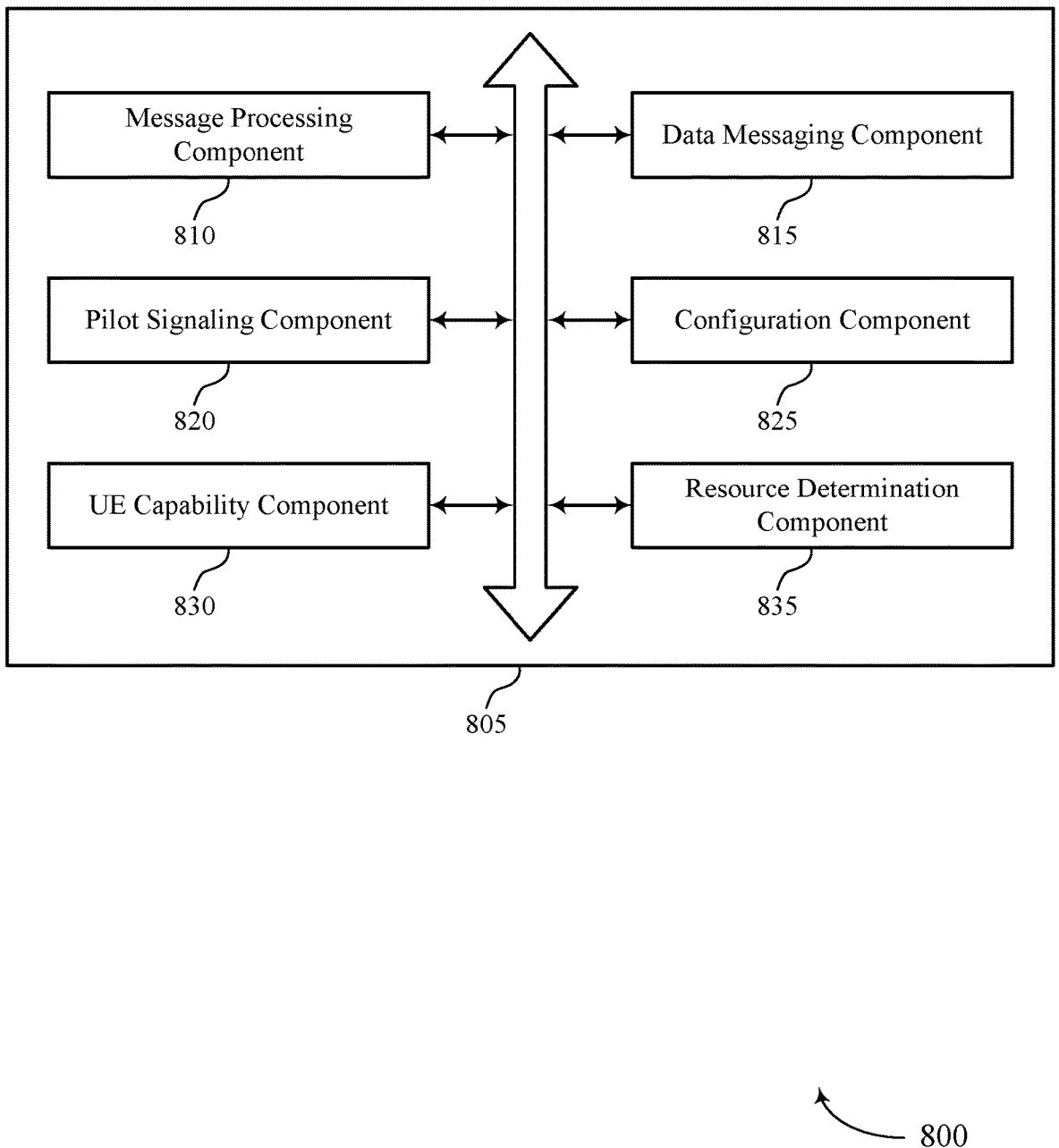
FIG. 8 shows a block diagram of a communications manager that supports pilot signaling supporting DPoD techniques in accordance with aspects of the present disclosure.

FIG. 8 shows a block diagram 800 of a communications manager 805 that supports pilot signaling supporting DPoD techniques in accordance with aspects of the present disclosure. The communications manager 805 may be an example of aspects of a communications manager 615, a communications manager 715, or a communications manager 910 described herein. The communications manager 805 may include a message processing component 810, a data messaging component 815, a pilot signaling component 820, a configuration component 825, a UE capability component 830, a resource determination component 835, or some combination of these components. Each of these components may communicate, directly or indirectly, with one another (e.g., via one or more buses).

The communications manager 805 may be implemented at a UE. The message processing component 810 may process a data message for transmission, where a signal associated with the data message may include non-linear characteristics based on the processing. The data messaging component 815 may transmit, to a base station, the data message in a first set of frequency resources allocated for data communications at the UE.

The pilot signaling component 820 may transmit, to the base station, a first pilot signal within a first set of frequency resources, where the first set of frequency resources is allocated for data communications at the UE. The pilot signaling component 820 may further transmit, to the base station, a second pilot signal outside the first set of frequency resources and within a second set of frequency resources. The first set of frequency resources may be a subset of the second set of frequency resources. The first pilot signal and the second pilot signal may be associated with a same data message.

In some cases, the set of pilot signals (e.g., including the first pilot signal and the second pilot signal) may include a set of DMRSs and the set of pilot signals may be transmitted concurrent with the data message. Additionally or alternatively, the set of pilot signals (e.g., including the first pilot signal and the second pilot signal) may include a set of SRSs and the set of pilot signals may be transmitted according to an SRS periodicity. In some cases, the data message and the set of pilot signals (e.g., including the first pilot signal and the second pilot signal) may be transmitted using a same antenna port, a same transmit beam, or a combination thereof.

In some cases, the first set of frequency resources includes a CC bandwidth and the second set of frequency resources includes a set of CC bandwidths including the CC bandwidth. In some other cases, the first set of frequency resources includes a sub-band of a CC bandwidth and the second set of frequency resources includes a set of sub-bands of the CC bandwidth, the CC bandwidth, a set of sub-bands of a set of CC bandwidths, or a combination thereof including the sub-band of the CC bandwidth.

The configuration component 825 may receive, from the base station, a configuration message indicating the second set of frequency resources for transmitting a set of pilot signals, where the set of pilot signals includes the first pilot signal and the second pilot signal. In some examples, the configuration component 825 may determine an allocation of the first set of frequency resources for the data communications at the UE based on the configuration message. In some cases, the configuration message may include an RRC configuration message, a DCI message, or a combination thereof.

The UE capability component 830 may transmit, to the base station, a UE capability message indicating a first capability of the UE to transmit the data message for DPoD processing at the base station, a second capability of the UE to transmit a set of pilot signals distributed across the second set of frequency, or a combination thereof. The transmitting the second pilot signal may be based on the UE capability message. In some examples, the configuration component 825 may receive, from the base station and in response to the UE capability message, a configuration message configuring the UE to implement the first capability, the second capability, or a combination thereof, where transmitting the second pilot signal is further based on the configuration message.

In some examples, the first set of frequency resources includes in-band frequency resources allocated for the data communications, and the second set of frequency resources includes the in-band frequency resources and OOB frequency resources unallocated for the data communications. The resource determination component 835 may determine the OOB frequency resources based on an estimated non-linearity characteristic of the data message. In some examples, the resource determination component 835 may select the OOB frequency resources based on the estimated non-linearity characteristic of the data message satisfying an interference threshold for the OOB frequency resources.

Figure 9:
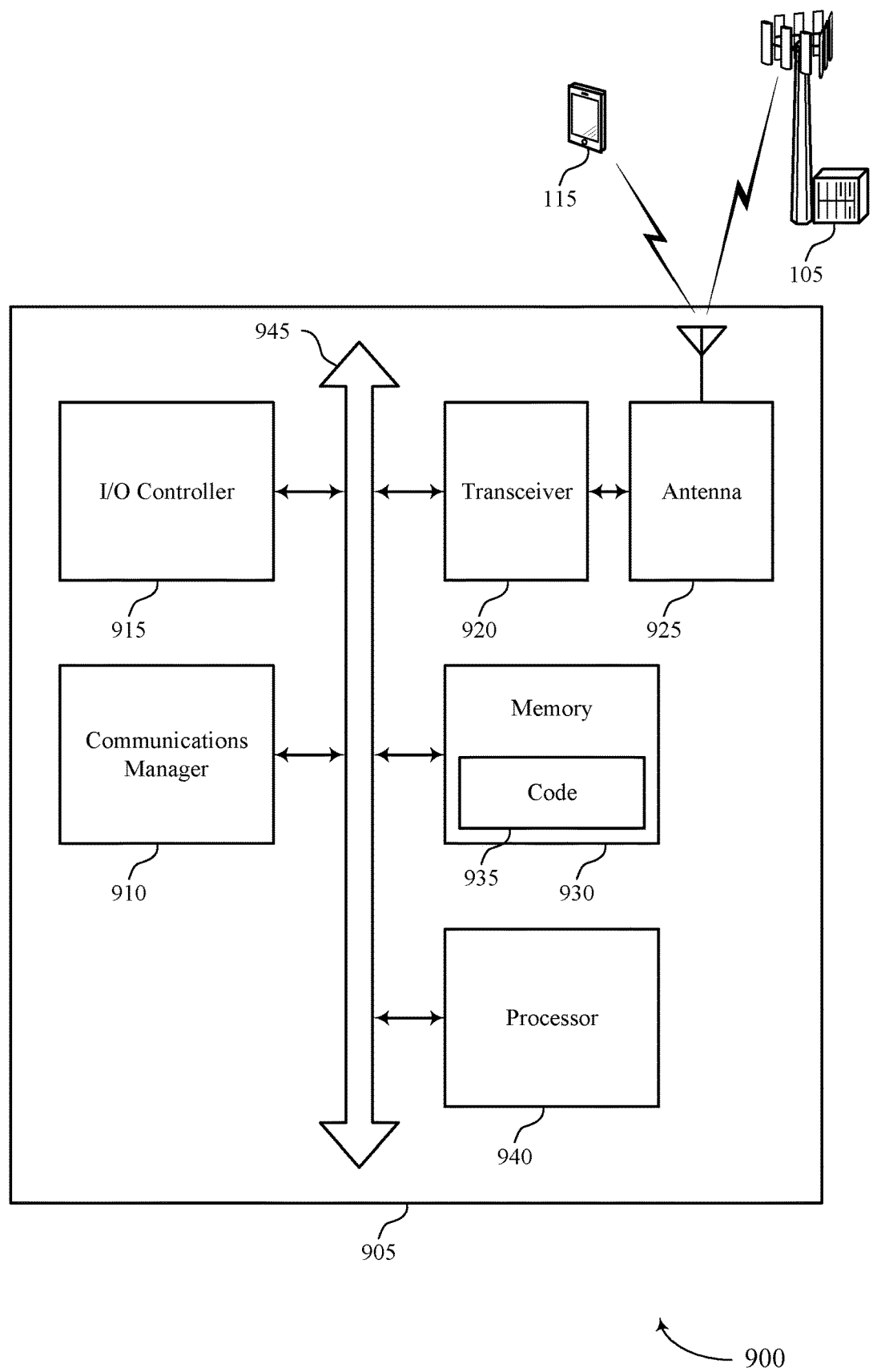
FIG. 9 shows a diagram of a system including a device that supports pilot signaling supporting DPoD techniques in accordance with aspects of the present disclosure.

FIG. 9 shows a diagram of a system 900 including a device 905 that supports pilot signaling supporting DPoD techniques in accordance with aspects of the present disclosure. The device 905 may be an example of or include the components of a device 605, a device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may be implemented at a UE. The communications manager 910 may transmit, to a base station, a first pilot signal within a first set of frequency resources, where the first set of frequency resources is allocated for data communications at the UE and may transmit, to the base station, a second pilot signal outside the first set of frequency resources and within a second set of frequency resources. The first set of frequency resources may be a subset of the second set of frequency resources, and the first pilot signal and the second pilot signal may be associated with a same data message.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting pilot signaling that provides for DPoD techniques in multi-user systems).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
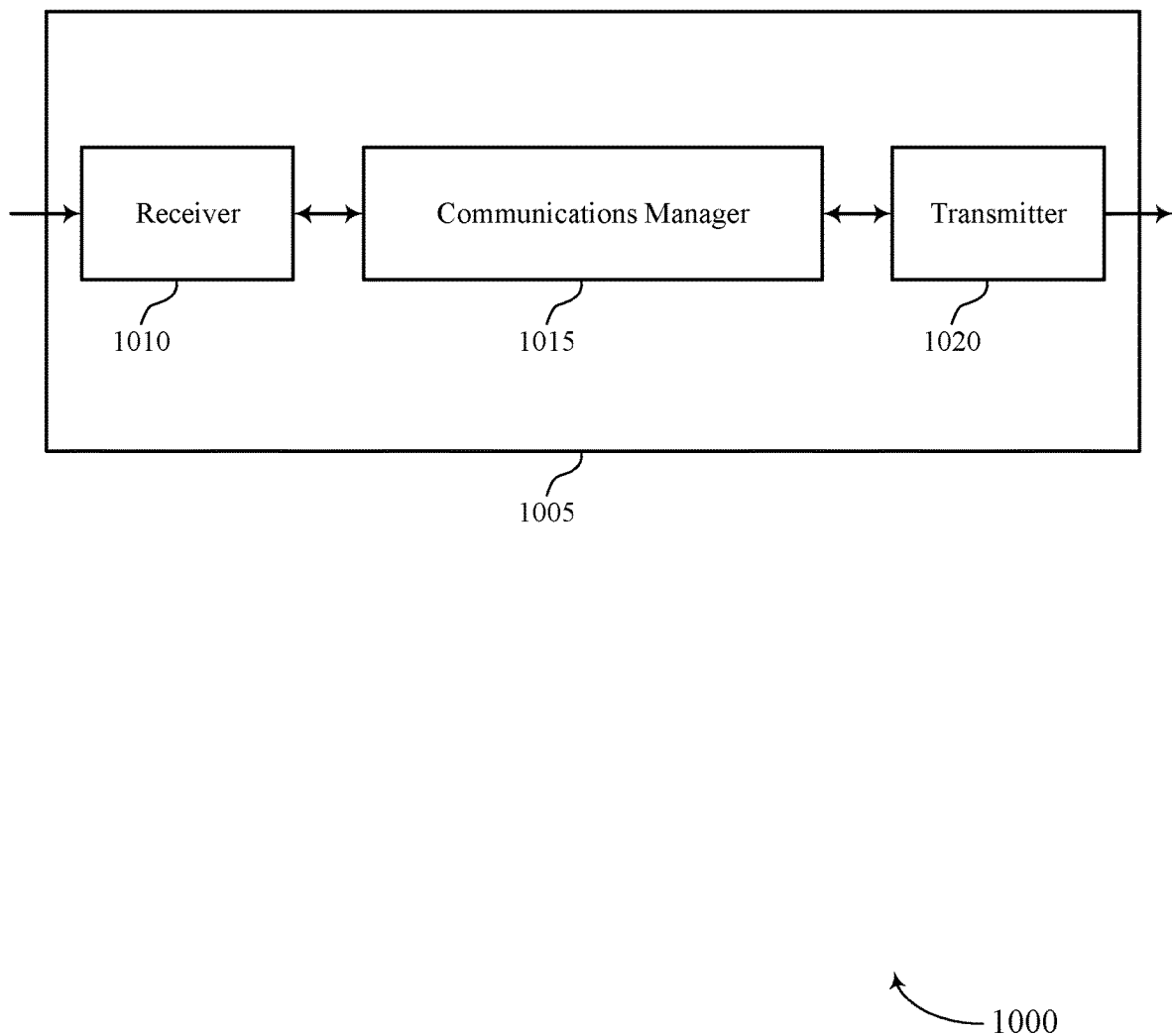
FIGS. 10 and 11 show block diagrams of devices that support pilot signaling supporting DPoD techniques in accordance with aspects of the present disclosure.

FIG. 10 shows a block diagram 1000 of a device 1005 that supports pilot signaling supporting DPoD techniques in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to pilot signaling supporting DPoD techniques, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may allocate a first set of frequency resources for data communications of a UE and may receive, from the UE, a set of pilot signals distributed across a second set of frequency resources different from the first set of frequency resources, where the first set of frequency resources is a subset of the second set of frequency resources. The communications manager 1015 may perform channel estimation based on the set of pilot signals and may decode a data message based on the channel estimation. The communications manager 1015 may be an example of aspects of the communications manager 1310 described herein. In some examples, one or more aspects of the communications manager 1015 may be implemented by—or in conjunction with—the receiver 1010, the transmitter 1020, or a combination thereof.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
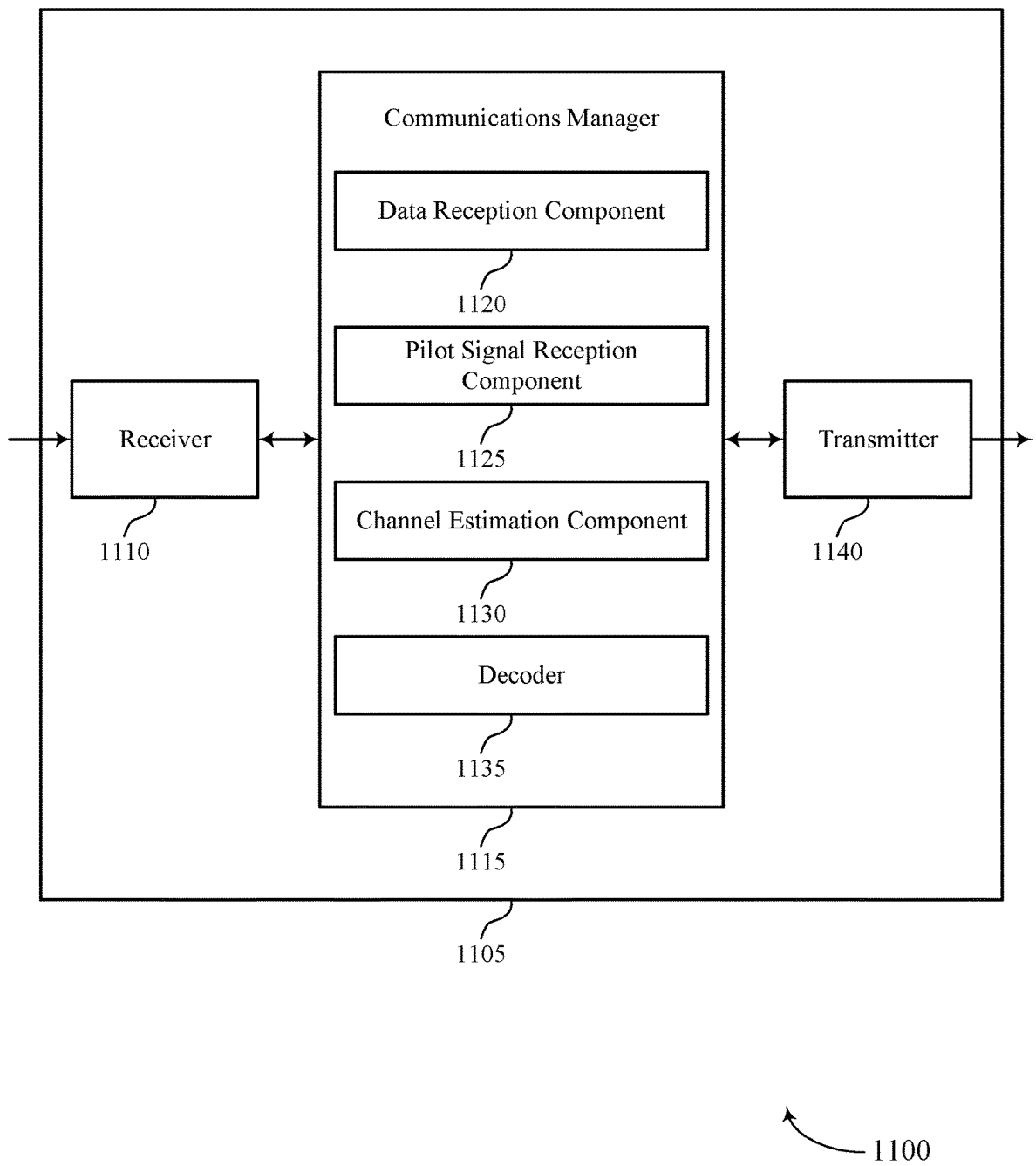

FIG. 11 shows a block diagram 1100 of a device 1105 that supports pilot signaling supporting DPoD techniques in accordance with aspects of the present disclosure. The device 1105 may be an example of aspects of a device 1005 or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to pilot signaling supporting DPoD techniques, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a data reception component 1120, a pilot signal reception component 1125, a channel estimation component 1130, and a decoder 1135. The communications manager 1115 may be an example of aspects of the communications manager 1310 described herein.

The data reception component 1120 may allocate a first set of frequency resources for data communications of a UE. The pilot signal reception component 1125 may receive, from the UE, a set of pilot signals distributed across a second set of frequency resources different from the first set of frequency resources, where the first set of frequency resources is a subset of the second set of frequency resources. The channel estimation component 1130 may perform channel estimation based on the set of pilot signals. The decoder 1135 may decode a data message based on the channel estimation.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
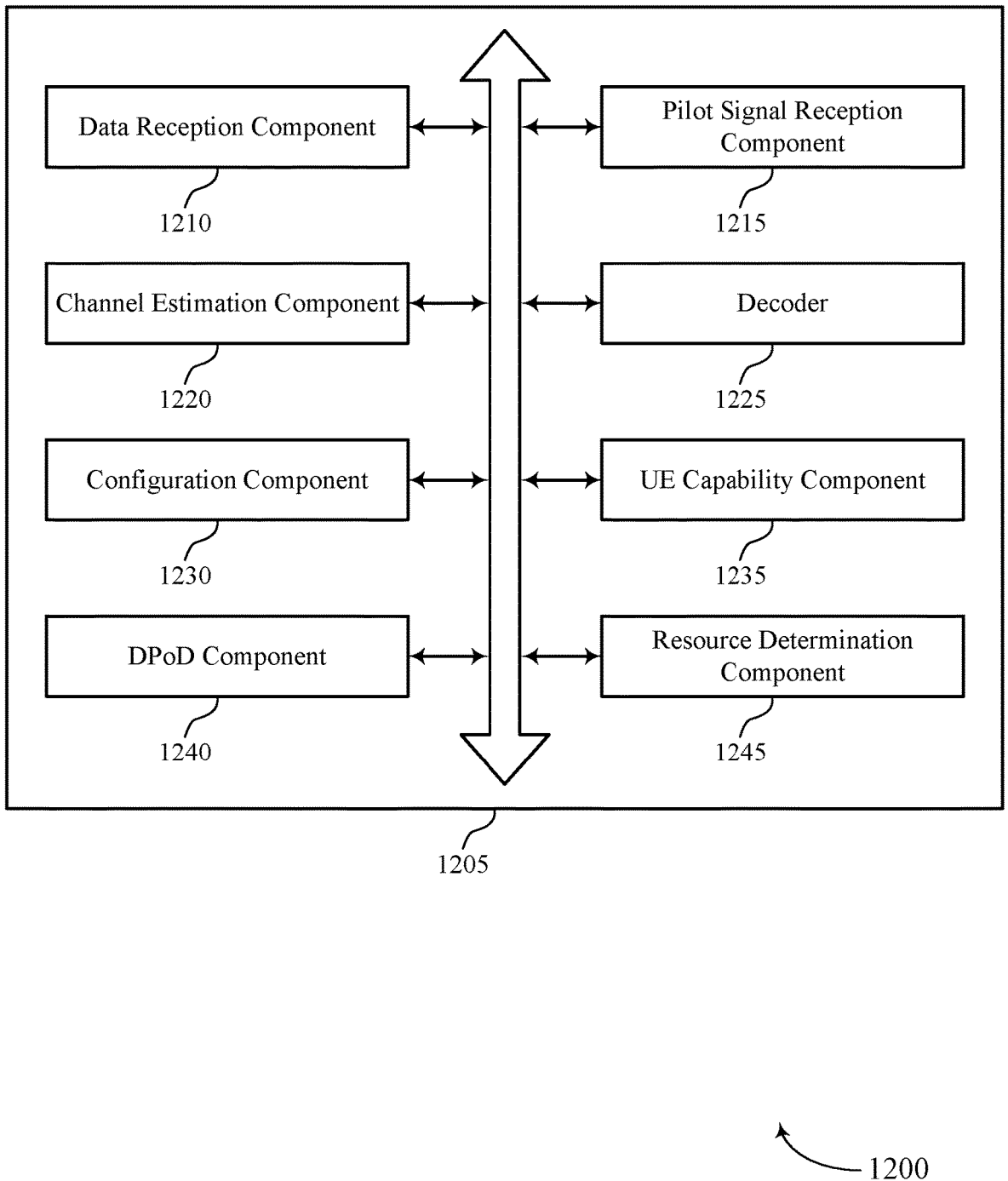
FIG. 12 shows a block diagram of a communications manager that supports pilot signaling supporting DPoD techniques in accordance with aspects of the present disclosure.

FIG. 12 shows a block diagram 1200 of a communications manager 1205 that supports pilot signaling supporting DPoD techniques in accordance with aspects of the present disclosure. The communications manager 1205 may be an example of aspects of a communications manager 1015, a communications manager 1115, or a communications manager 1310 described herein. The communications manager 1205 may include a data reception component 1210, a pilot signal reception component 1215, a channel estimation component 1220, a decoder 1225, a configuration component 1230, a UE capability component 1235, a DPoD component 1240, a resource determination component 1245, or some combination thereof. Each of these components may communicate, directly or indirectly, with one another (e.g., via one or more buses).

The communications manager 1205 may be implemented at a base station. The data reception component 1210 may allocate a first set of frequency resources for data communications of a UE. The pilot signal reception component 1215 may receive, from the UE, a set of pilot signals distributed across a second set of frequency resources different from the first set of frequency resources, where the first set of frequency resources is a subset of the second set of frequency resources. In some cases, the set of pilot signals includes a set of DMRSs and the set of pilot signals is received concurrently with a data message. Additionally or alternatively, the set of pilot signals may include a set of SRSs and the set of pilot signals may be received according to an SRS periodicity.

The channel estimation component 1220 may perform channel estimation based on the set of pilot signals. The decoder 1225 may decode a data message based on the channel estimation.

In some examples, the data reception component 1210 may receive, from the UE, a first data message in the first set of frequency resources and may receive, from a second UE, a second data message in a third set of frequency resources allocated for data communications of the second UE, where the third set of frequency resources may at least partially overlap with the second set of frequency resources for a set of overlapping frequency resources. In some examples, the channel estimation component 1220 may determine, based on the channel estimation, interference in the overlapping frequency resources from the first data message, where decoding the data message involves decoding the second data message from the second UE based on the determined interference from the first data message.

In some examples, signaling associated with the data message may include a non-linearity characteristic (e.g., based on processing of the data message at the UE). The DPoD component 1240 may perform a DPoD technique on the data message and the channel estimation, and the decoder 1225 may decode the data message based on performing the DPoD technique.

The configuration component 1230 may transmit, to the UE, a configuration message indicating the second set of frequency resources for transmitting the set of pilot signals. In some cases, the configuration message be an example of an RRC configuration message, a DCI message, or a combination thereof.

The UE capability component 1235 may receive, from the UE, a UE capability message indicating a first capability of the UE to transmit data messages for DPoD processing at the base station, a second capability of the UE to transmit the set of pilot signals distributed across the second set of frequency resources different from the first set of frequency resources, or a combination thereof, where performing the channel estimation is based on the UE capability message. In some examples, the configuration component 1230 may transmit, to the UE and in response to the UE capability message, a configuration message configuring the UE to implement the first capability, the second capability, or a combination thereof, where the set of pilot signals is received distributed across the second set of frequency resources different from the first set of frequency resources based on the configuration message.

In some examples, the first set of frequency resources includes in-band frequency resources allocated for the data communications of the UE, and the second set of frequency resources includes the in-band frequency resources for the UE and OOB frequency resources unallocated for the data communications of the UE. The resource determination component 1245 may determine the OOB frequency resources for the UE based on an estimated non-linearity characteristic of the data communications of the UE.

In some examples, determining the OOB frequency resources for the UE may involve the resource determination component 1245 selecting the OOB frequency resources for the UE based on the estimated non-linearity characteristic satisfying an interference threshold for the OOB frequency resources for the UE. In some cases, the OOB frequency resources for the UE are selected further based on the OOB frequency resources for the UE corresponding to in-band frequency resources for a second UE.

In some examples, the resource determination component 1245 may determine the second set of frequency resources such that the second set of frequency resources includes a first frequency buffer region contiguous to a lower frequency edge of the first set of frequency resources and a second frequency buffer region contiguous to an upper frequency edge of the first set of frequency resources.

In some examples, the set of pilot signals may be a first set of pilot signals, and the pilot signal reception component 1215 may receive, from a second UE, a second set of pilot signals distributed across at least a third set of frequency resources that at least partially overlaps with the second set of frequency resources for a set of overlapping frequency resources, where pilot signals of the first set of pilot signals and pilot signals of the second set of pilot signals are interleaved in frequency in the set of overlapping frequency resources. In some examples, the channel estimation component 1220 may perform the channel estimation further based on the second set of pilot signals.

Figure 13:
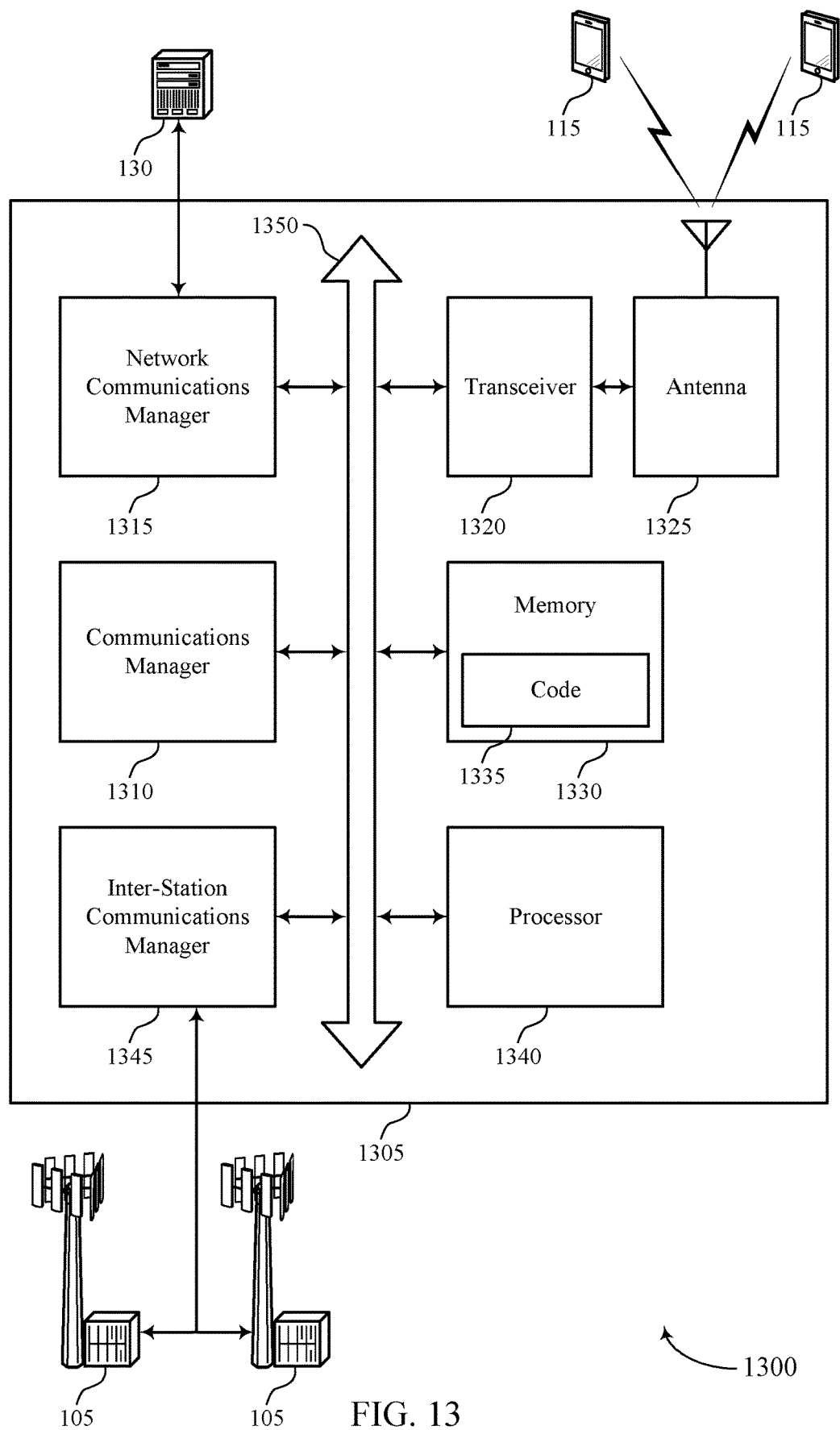
FIG. 13 shows a diagram of a system including a device that supports pilot signaling supporting DPoD techniques in accordance with aspects of the present disclosure.

FIG. 13 shows a diagram of a system 1300 including a device 1305 that supports pilot signaling supporting DPoD techniques in accordance with aspects of the present disclosure. The device 1305 may be an example of or include the components of a device 1005, a device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may allocate a first set of frequency resources for data communications of a UE, receive, from the UE, a set of pilot signals distributed across a second set of frequency resources different from the first set of frequency resources, where the first set of frequency resources is a subset of the second set of frequency resources, perform channel estimation based on the set of pilot signals, and decode a data message based on the channel estimation.

The network communications manager 1315 may manage communications with the core network 130 (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting pilot signaling that provides for DPoD techniques in a multi-user system).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
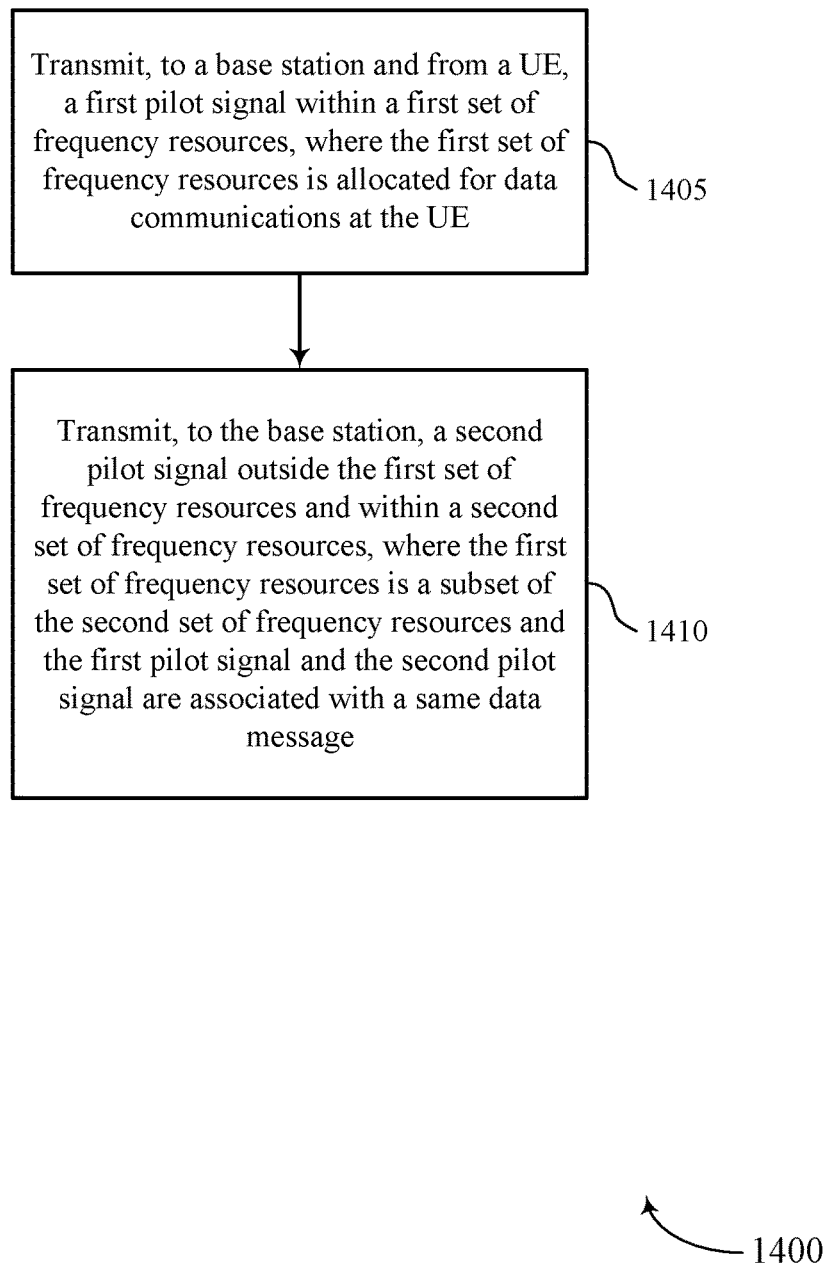
FIGS. 14 through 17 show flowcharts illustrating methods that support pilot signaling supporting DPoD techniques in accordance with aspects of the present disclosure.

FIG. 14 shows a flowchart illustrating a method 1400 that supports pilot signaling supporting DPoD techniques in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may transmit, to a base station, a first pilot signal within a first set of frequency resources, where the first set of frequency resources is allocated for data communications at the UE. The operations of 1405 may be performed according to the methods described herein. In some examples, aspects of the operations of 1405 may be performed by a pilot signaling component as described with reference to FIGS. 6 through 9.

At 1410, the UE may transmit, to the base station, a second pilot signal outside the first set of frequency resources and within a second set of frequency resources. The first set of frequency resources may be a subset of the second set of frequency resources, and the first pilot signal and the second pilot signal may be associated with a same data message. The operations of 1410 may be performed according to the methods described herein. In some examples, aspects of the operations of 1410 may be performed by a pilot signaling component as described with reference to FIGS. 6 through 9.

Figure 15:
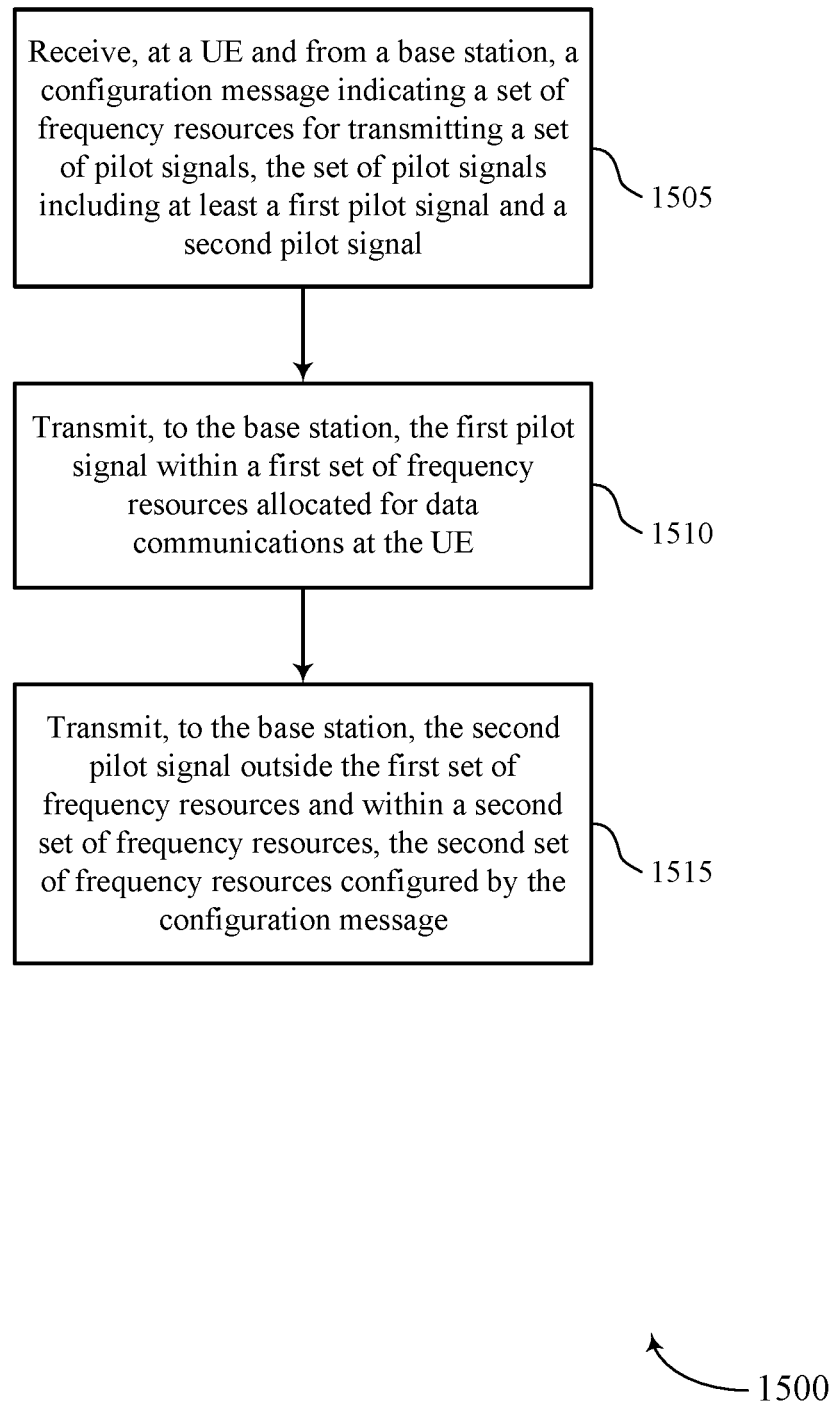

FIG. 15 shows a flowchart illustrating a method 1500 that supports pilot signaling supporting DPoD techniques in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a configuration message indicating a second set of frequency resources for transmitting a set of pilot signals. The set of pilot signals may include at least a first pilot signal and a second pilot signal. The operations of 1505 may be performed according to the methods described herein. In some examples, aspects of the operations of 1505 may be performed by a configuration component as described with reference to FIGS. 6 through 9.

At 1510, the UE may transmit, to the base station, the first pilot signal within a first set of frequency resources, where the first set of frequency resources is allocated for data communications at the UE. The operations of 1510 may be performed according to the methods described herein. In some examples, aspects of the operations of 1510 may be performed by a pilot signaling component as described with reference to FIGS. 6 through 9.

At 1515, the UE may transmit, to the base station, the second pilot signal outside the first set of frequency resources and within a second set of frequency resources based on the configuration message. The first set of frequency resources may be a subset of the second set of frequency resources, and the first pilot signal and the second pilot signal may be associated with a same data message. The operations of 1515 may be performed according to the methods described herein. In some examples, aspects of the operations of 1515 may be performed by a pilot signaling component as described with reference to FIGS. 6 through 9.

Figure 16:
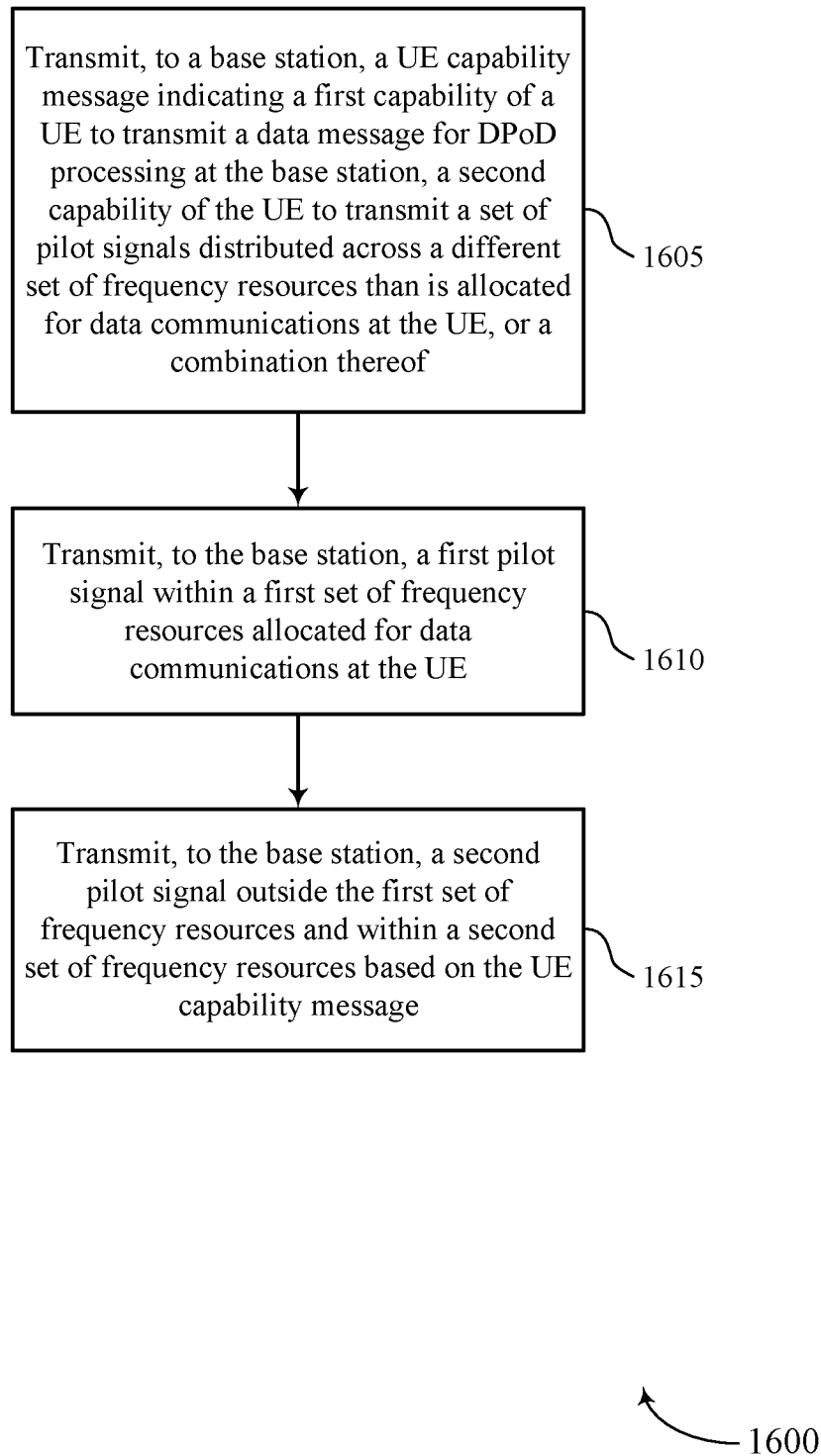

FIG. 16 shows a flowchart illustrating a method 1600 that supports pilot signaling supporting DPoD techniques in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may transmit, to a base station, a UE capability message indicating a first capability of the UE to transmit a data message for DPoD processing at the base station, a second capability of the UE to transmit a set of pilot signals distributed across a second set of frequency resources different from a first set of frequency resources allocated for data communications at the UE, or a combination thereof. The operations of 1605 may be performed according to the methods described herein. In some examples, aspects of the operations of 1605 may be performed by a UE capability component as described with reference to FIGS. 6 through 9.

At 1610, the UE may transmit, to the base station, a first pilot signal within the first set of frequency resources allocated for data communications at the UE. The operations of 1610 may be performed according to the methods described herein. In some examples, aspects of the operations of 1610 may be performed by a pilot signaling component as described with reference to FIGS. 6 through 9.

At 1615, the UE may transmit, to the base station, a second pilot signal outside the first set of frequency resources and within the second set of frequency resources based on the UE capability message. The first set of frequency resources may be a subset of the second set of frequency resources, and the first pilot signal and the second pilot signal may be associated with a same data message. The operations of 1615 may be performed according to the methods described herein. In some examples, aspects of the operations of 1615 may be performed by a pilot signaling component as described with reference to FIGS. 6 through 9.

Figure 17:
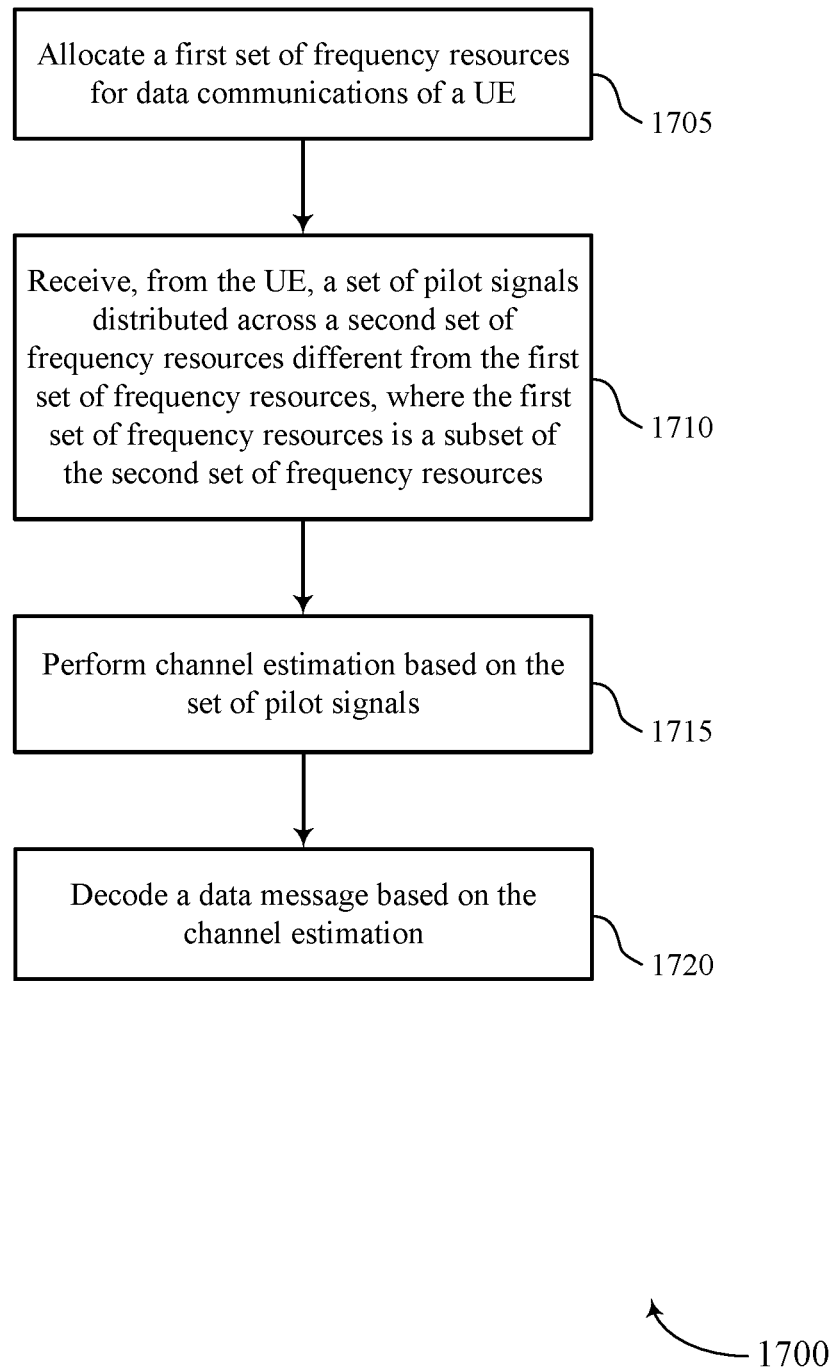

FIG. 17 shows a flowchart illustrating a method 1700 that supports pilot signaling supporting DPoD techniques in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may allocate a first set of frequency resources for data communications of a UE. The operations of 1705 may be performed according to the methods described herein. In some examples, aspects of the operations of 1705 may be performed by a data reception component as described with reference to FIGS. 10 through 13.

At 1710, the base station may receive, from the UE, a set of pilot signals distributed across a second set of frequency resources different from the first set of frequency resources, where the first set of frequency resources is a subset of the second set of frequency resources. The operations of 1710 may be performed according to the methods described herein. In some examples, aspects of the operations of 1710 may be performed by a pilot signal reception component as described with reference to FIGS. 10 through 13.

At 1715, the base station may perform channel estimation based on the set of pilot signals. The operations of 1715 may be performed according to the methods described herein. In some examples, aspects of the operations of 1715 may be performed by a channel estimation component as described with reference to FIGS. 10 through 13.

At 1720, the base station may decode a data message based on the channel estimation. The operations of 1720 may be performed according to the methods described herein. In some examples, aspects of the operations of 1720 may be performed by a decoder as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Also, as used herein, the phrase "a set" shall be construed as including the possibility of a set with one member. That is, the phrase "a set" shall be construed in the same manner as "one or more."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   transmitting, to a network device, a first pilot signal within a first set of frequency resources, wherein the first set of frequency resources comprises in-band frequency resources allocated for data communications of the UE; and
   transmitting, to the network device, a second pilot signal outside the first set of frequency resources and within a second set of frequency resources, wherein:
      the first set of frequency resources is a subset of the second set of frequency resources, the second set of frequency resources comprising the in-band frequency resources allocated for the data communications of the UE and further comprising out-of-band frequency resources unallocated for the data communications of the UE; and
      the first pilot signal and the second pilot signal are associated with a same data message.

2. The method of claim 1, further comprising:
   receiving, from the network device, a configuration message indicating the second set of frequency resources for transmitting a plurality of pilot signals, wherein the plurality of pilot signals comprises the first pilot signal and the second pilot signal.

3. The method of claim 2, further comprising:
   determining an allocation of the first set of frequency resources for the data communications of the UE based at least in part on the configuration message.

4. The method of claim 2, wherein the configuration message comprises a radio resource control configuration message, a downlink control information message, or a combination thereof.

5. The method of claim 1, further comprising:
   transmitting, to the network device, a UE capability message indicating a first capability of the UE to transmit the data message for digital post-distortion processing at the network device, a second capability of the UE to transmit a plurality of pilot signals distributed across the second set of frequency resources, or a combination thereof, wherein transmitting the second pilot signal is based at least in part on the UE capability message.

6. The method of claim 5, further comprising:
   receiving, from the network device and in response to the UE capability message, a configuration message configuring the UE to implement the first capability, the second capability, or a combination thereof, wherein transmitting the second pilot signal is further based at least in part on the configuration message.

7. The method of claim 1, wherein further comprising:
   determining the out-of-band frequency resources based at least in part on an estimated non-linearity characteristic of the data message.

8. The method of claim 7, wherein determining the out-of-band frequency resources comprises:
   selecting the out-of-band frequency resources based at least in part on the estimated non-linearity characteristic of the data message satisfying an interference threshold for the out-of-band frequency resources.

9. The method of claim 1, wherein:
   the first pilot signal and the second pilot signal comprise demodulation reference signals and are transmitted concurrent with the data message; or
   the first pilot signal and the second pilot signal comprise sounding reference signals and are transmitted according to a sounding reference signal periodicity.

10. The method of claim 1, wherein:
    the first set of frequency resources comprises a component carrier bandwidth and the second set of frequency resources comprises a plurality of component carrier bandwidths including the component carrier bandwidth; or
    the first set of frequency resources comprises a sub-band of the component carrier bandwidth and the second set of frequency resources comprises a plurality of sub-bands of the component carrier bandwidth, the component carrier bandwidth, a plurality of sub-bands of the plurality of component carrier bandwidths, or a combination thereof including the sub-band of the component carrier bandwidth.

11. The method of claim 1, further compressing:
    transmitting the data message using a same antenna port as the first pilot signal and the second pilot signal, a same transmit beam as the first pilot signal and the second pilot signal, or a combination thereof.

12. A method for wireless communications at a network device, comprising:
    allocating a first set of frequency resources to a user equipment (UE), the first set of frequency resources comprising in-band frequency resources for data communications of the UE;
    receiving, from the UE, a plurality of pilot signals distributed across a second set of frequency resources different from the first set of frequency resources, wherein the first set of frequency resources is a subset of the second set of frequency resources, the second set of frequency resources comprising the in-band frequency resources allocated for the data communications of the UE and further comprising out-of-band frequency resources unallocated for the data communications of the UE;
    performing channel estimation based at least in part on the plurality of pilot signals; and
    decoding a data message based at least in part on the channel estimation.

13. The method of claim 12, further comprising:
    receiving, from the UE, a first data message in the first set of frequency resources;
    receiving, from a second UE, a second data message in a third set of frequency resources allocated for data communications of the second UE, wherein the third set of frequency resources at least partially overlaps with the second set of frequency resources for a set of overlapping frequency resources; and
    determining, based at least in part on the channel estimation, interference in the overlapping frequency resources from the first data message, wherein decoding the data message comprises decoding the second data message from the second UE based at least in part on the determined interference from the first data message.

14. The method of claim 12, further comprising:
    transmitting, to the UE, a configuration message indicating the second set of frequency resources for transmitting the plurality of pilot signals.

15. The method of claim 12, further comprising:
receiving, from the UE, a UE capability message indicating a first capability of the UE to transmit data messages for digital post-distortion processing at the network device, a second capability of the UE to transmit the plurality of pilot signals distributed across the second set of frequency resources different from the first set of frequency resources, or a combination thereof, wherein performing the channel estimation is based at least in part on the UE capability message.

16. The method of claim 15, further comprising:
transmitting, to the UE and in response to the UE capability message, a configuration message configuring the UE to implement the first capability, the second capability, or a combination thereof, wherein the plurality of pilot signals is received distributed across the second set of frequency resources different from the first set of frequency resources based at least in part on the configuration message.

17. The method of claim 12, wherein signaling associated with the data message comprises a non-linearity characteristic, the method further comprising:
performing a digital post-distortion technique on the data message and the channel estimation; and
decoding the data message based at least in part on performing the digital post-distortion technique.

18. The method of claim 12, further comprising:
determining the out-of-band frequency resources for the UE based at least in part on an estimated non-linearity characteristic of the data communications of the UE.

19. The method of claim 18, wherein determining the out-of-band frequency resources for the UE comprises:
selecting the out-of-band frequency resources for the UE based at least in part on the estimated non-linearity characteristic satisfying an interference threshold for the out-of-band frequency resources for the UE.

20. The method of claim 19, wherein the out-of-band frequency resources for the UE are selected further based at least in part on the out-of-band frequency resources for the UE corresponding to in-band frequency resources for a second UE.

21. The method of claim 12, further comprising:
determining the second set of frequency resources such that the second set of frequency resources comprises:
a first frequency buffer region contiguous to a lower frequency edge of the first set of frequency resources; and
a second frequency buffer region contiguous to an upper frequency edge of the first set of frequency resources.

22. The method of claim 12, wherein the plurality of pilot signals comprises a first plurality of pilot signals, the method further comprising:
receiving, from a second UE, a second plurality of pilot signals distributed across at least a third set of frequency resources that at least partially overlaps with the second set of frequency resources for a set of overlapping frequency resources, wherein pilot signals of the first plurality of pilot signals and pilot signals of the second plurality of pilot signals are interleaved in frequency in the set of overlapping frequency resources.

23. The method of claim 22, wherein performing the channel estimation is further based at least in part on the second plurality of pilot signals.

24. The method of claim 12, wherein:
the plurality of pilot signals comprises a plurality of demodulation reference signals and is received concurrently with the data message; or
the plurality of pilot signals comprises a plurality of sounding reference signals and is received according to a sounding reference signal periodicity.

25. An apparatus for wireless communications at a user equipment (UE), comprising a processor, memory coupled to the processor, and instructions stored in the memory and executable by the processor to cause the apparatus to:
transmit, to a network device, a first pilot signal within a first set of frequency resources, wherein the first set of frequency resources comprises in-band frequency resources allocated for data communications of the UE; and
transmit, to the network device, a second pilot signal outside the first set of frequency resources and within a second set of frequency resources, wherein:
the first set of frequency resources is a subset of the second set of frequency resources, the second set of frequency resources comprising the in-band frequency resources allocated for the data communications of the UE and further comprising out-of-band frequency resources unallocated for the data communications of the UE; and
the first pilot signal and the second pilot signal are associated with a same data message.

26. The apparatus of claim 25, wherein the instructions are further executable by the processor to cause the apparatus to:
receive, from the network device, a configuration message indicating the second set of frequency resources for transmitting a plurality of pilot signals, wherein the plurality of pilot signals comprises the first pilot signal and the second pilot signal.

27. The apparatus of claim 25, wherein the instructions are further executable by the processor to cause the apparatus to:
transmit, to the network device, a UE capability message indicating a first capability of the UE to transmit the data message for digital post-distortion processing at the network device, a second capability of the UE to transmit a plurality of pilot signals distributed across the second set of frequency resources, or a combination thereof, wherein the instructions to transmit the second pilot signal are executable by the processor to cause the apparatus to transmit the second pilot signal based at least in part on the UE capability message.

28. An apparatus for wireless communications at a network device, comprising a processor, memory coupled to the processor, and instructions stored in the memory and executable by the processor to cause the apparatus to:
allocate a first set of frequency resources to a user equipment (UE), the first set of frequency resources comprising in-band frequency resources for data communications of the UE;
receive, from the UE, a plurality of pilot signals distributed across a second set of frequency resources different from the first set of frequency resources, wherein the first set of frequency resources is a subset of the second set of frequency resources, the second set of frequency resources comprising the in-band frequency resources allocated for the data communications of the UE and out-of-band frequency resources unallocated for the data communications of the UE;
perform channel estimation based at least in part on the plurality of pilot signals; and decode a data message based at least in part on the channel estimation.

29. The apparatus of claim 28, wherein the instructions are further executable by the processor to cause the apparatus to:

receive, from the UE, a first data message in the first set of frequency resources;

receive, from a second UE, a second data message in a third set of frequency resources allocated for data communications of the second UE, wherein the third set of frequency resources at least partially overlaps with the second set of frequency resources for a set of overlapping frequency resources; and determine, based at least in part on the channel estimation, interference in the overlapping frequency resources from the first data message, wherein the instructions to decode the data message are executable by the processor to cause the apparatus to decode the second data message from the second UE based at least in part on the determined interference from the first data message.

30. The apparatus of claim 28, wherein the instructions are further executable by the processor to cause the apparatus to:

transmit, to the UE, a configuration message indicating the second set of frequency resources for transmitting the plurality of pilot signals.

* * * * *